(12) United States Patent
Kalev

(10) Patent No.: US 9,641,051 B2
(45) Date of Patent: May 2, 2017

(54) ELECTROMECHANICAL FLYWHEEL COOLING SYSTEM

(71) Applicant: Claude Michael Kalev, Newbury Park, CA (US)

(72) Inventor: Claude Michael Kalev, Newbury Park, CA (US)

(73) Assignee: Rotonix Hong Kong Limited, Newbury Park, CA (US)

( * ) Notice: Subject to any disclaimer, the term of this patent is extended or adjusted under 35 U.S.C. 154(b) by 481 days.

(21) Appl. No.: 14/354,121

(22) PCT Filed: Dec. 23, 2012

(86) PCT No.: PCT/US2012/071552
§ 371 (c)(1),
(2) Date: Apr. 24, 2014

(87) PCT Pub. No.: WO2013/096946
PCT Pub. Date: Jun. 27, 2013

(65) Prior Publication Data
US 2014/0292120 A1    Oct. 2, 2014

Related U.S. Application Data

(60) Provisional application No. 61/580,220, filed on Dec. 24, 2011.

(51) Int. Cl.
*H02K 9/19*      (2006.01)
*H02K 9/197*    (2006.01)
*H02K 7/02*      (2006.01)

(52) U.S. Cl.
CPC ............. *H02K 9/197* (2013.01); *H02K 7/025* (2013.01); *H02K 9/19* (2013.01); *Y02E 60/16* (2013.01)

(58) Field of Classification Search
CPC ........... H02K 9/197; H02K 7/025; H02K 9/19
USPC .......................................................... 310/54
See application file for complete search history.

(56) References Cited

U.S. PATENT DOCUMENTS

| | | | |
|---|---|---|---|
| 5,760,508 A | 6/1998 | Jennings et al. | |
| 5,969,446 A | 10/1999 | Eisenhaure et al. | |
| 6,175,172 B1 | 1/2001 | Bakholdin et al. | |
| 6,624,542 B1 | 9/2003 | Gabrys et al. | |
| 2003/0127931 A1* | 7/2003 | Kusase | H02K 19/103 310/184 |
| 2004/0108781 A1* | 6/2004 | Razzell | H02K 7/11 310/112 |
| 2004/0227415 A1 | 11/2004 | Gotmalm | |

(Continued)

FOREIGN PATENT DOCUMENTS

| | | |
|---|---|---|
| JP | 11-355980 A | 12/1999 |
| JP | 11337240 A | 12/1999 |
| JP | 2002-303257 A | 10/2002 |

*Primary Examiner* — Terrance Kenerly
(74) *Attorney, Agent, or Firm* — Paul D. Chancellor; Ocean Law

(57) ABSTRACT

An electromechanical flywheel machine includes a flywheel mass and a motor-generator having a rotor rotatable about a stator wherein the stator is supported by a fluid cooled stator support. The electromechanical flywheel has the rotor encircling a stationery stator and stator windings including a field winding encircling an axis of stator rotation and an armature winding that does not encircle the axis of stator rotation.

22 Claims, 16 Drawing Sheets

(56) References Cited

U.S. PATENT DOCUMENTS

2005/0040776 A1     2/2005   Sibley
2010/0207468 A1     8/2010   Kalev et al.

* cited by examiner

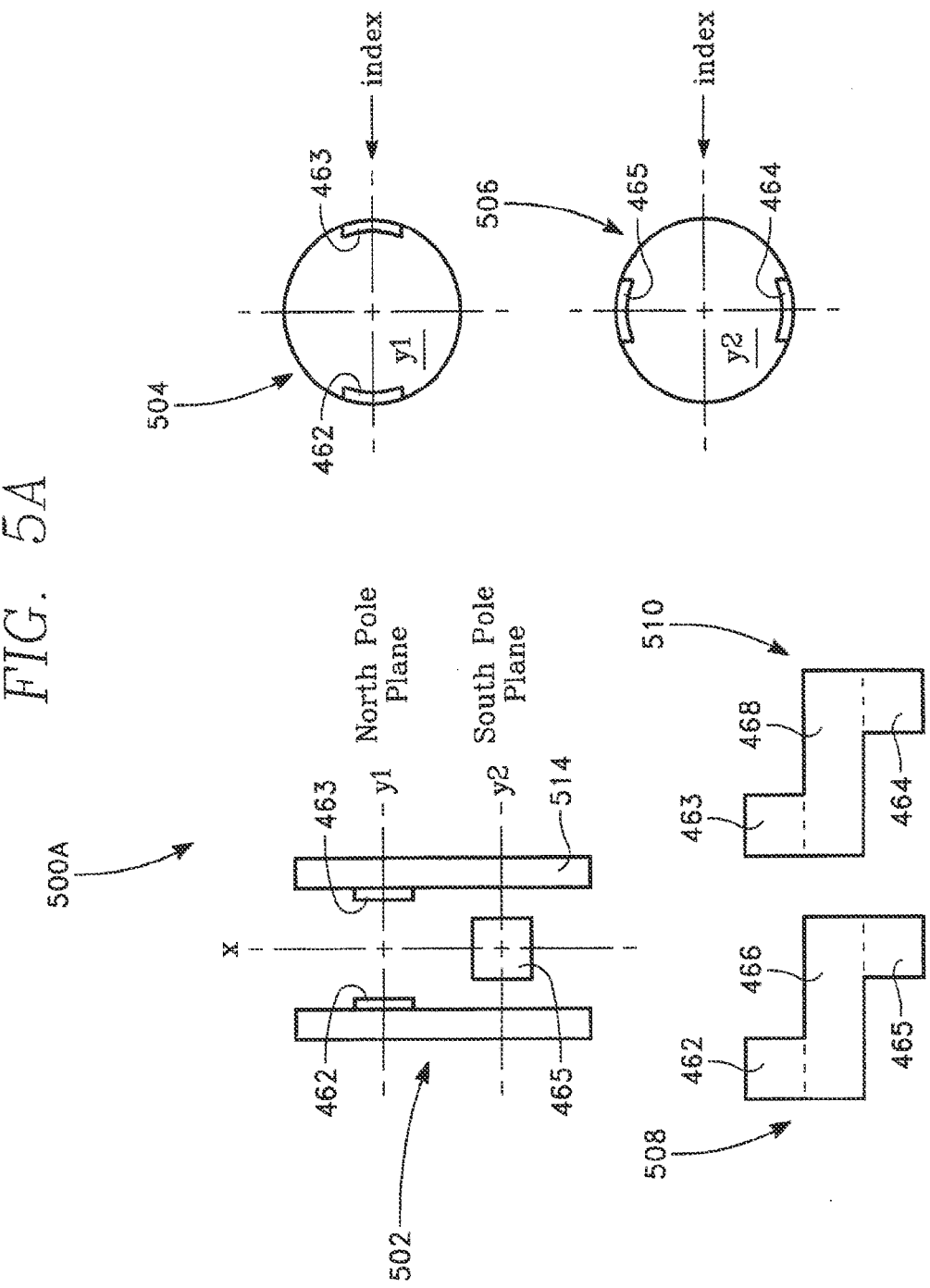

ELECTROMECHANICAL FLYWHEEL COOLING SYSTEM

PRIORITY CLAIM

This application claims the benefit of U.S. Provisional Application 61/580,220 filed 24 Dec. 2011 which is incorporated herein in its entirety and for all purposes.

BACKGROUND OF THE INVENTION

Known flywheels store kinetic energy, that is, the energy of motion. When called upon to release this energy, the flywheel slows as kinetic energy is depleted. Flywheels driving and driven by electric machines are also know. For decades, such electromechanical machines have been built and have achieved varying degrees of operational success. Widespread application has, however, eluded flywheel manufacturers as even the most advanced commercial machines suffer from significant operational limitations while exceeding the cost of better performing alternatives. Despite persistent efforts by a small flywheel manufacturing industry, modern electromechanical flywheels have found only narrow applications in a few niche markets and presently make no significant contribution to the developed world's energy supply.

Field of Invention

This invention relates to the electromechanical arts. In particular, an electromechanical flywheel employs a fluid coolant system.

Discussion of the Related Art

Electromechanical flywheels include machines operating under atmospheric conditions and machines operating under evacuated conditions. While machines operating in evacuated environments have benefitted from high speed operation, they have also been limited by available techniques to manage electromechanical flywheel component temperatures.

SUMMARY OF THE INVENTION

The present invention provides an electromechanical flywheel having a rotor encircling a stationery stator and stator windings including a field winding encircling an axis of stator rotation and an armature winding that does not encircle the axis of stator rotation.

In an embodiment, an electromechanical flywheel comprises a core assembly including a motor-generator stator supported by a fluid cooled stator support; a motor generator rotor surrounding the stator; the stator defining an axis of rotation, having a field coil that encircles the axis of rotation, and having an armature coil that does not encircle the axis of rotation; a flywheel mass encircles the rotor and is coupled to the rotor for rotation with the rotor; and, an evacuable housing that encloses the flywheel mass. The rotor is supported by first and second spaced apart suspension assemblies; the first suspension assembly includes a first electromagnetic bearing for applying centering and levitating forces to the rotor; and, the second suspension assembly includes a second electromagnetic bearing for applying centering forces to the rotor.

In an embodiment a motor-generator includes a rotor encircling a stator; a housing enclosing the motor-generator stator and rotor; the stator suspended by a hollow stator support; the stator support operative to transfer heat from the stator and to heat a fluid coolant in the stator hollow; a plurality of heat rods, each heat rod having a heat absorbing section and a heat rejecting section; the heat absorbing section of each heat rod inserted in a respective stator slot; and, the heat rejecting section of each heat rod thermally coupled to the fluid cooled stator support.

In some embodiments, the electromechanical flywheel above further comprises an entry conduit operative to supply fluid coolant to the stator support; and, the entry conduit and a surrounding wall of the stator support defining an annular flow space for removing fluid coolant from the stator support.

In some embodiments, the electromechanical flywheel above further comprises a fluid coolant pump moving fluid coolant in a coolant circuit; and, the coolant circuit including the entry conduit and the annular flow space.

In some embodiments, the electromechanical flywheel above further comprises an outer jacket encircling the motor-generator stator and rotor; and, the outer jacket for cooling a fluid in an outer jacket flow passage.

In some embodiments, the cooling circuit of the electromechanical flywheel above includes the outer jacket flow passage. And, in some embodiments the electromechanical flywheel has inner and outer jacket flow passages that are separated by a common intermediate wall. And, in some embodiments, the electromechanical flywheel outer jacket has an outer air cooled wall.

In some embodiments, the electromechanical flywheel above further comprises: an outer jacket encircling the motor-generator stator and rotor; and, the outer jacket for cooling a fluid in an outer jacket flow passage.

In some embodiments, the electromechanical flywheel above further comprises: an inner jacket encircling the motor-generator stator and rotor; the inner jacket encircled by the outer jacket; and, the inner jacket for heating a fluid in an inner jacket flow passage.

In some embodiments, the electromechanical flywheel above further comprises a fluid coolant pump moving fluid coolant in a coolant circuit; and, the coolant circuit including an entry conduit passing through a fluid plenum, the entry conduit operative to supply fluid coolant to the stator support, the entry conduit and a surrounding wall of the stator support defining an annular flow space for removing fluid coolant from the stator support, the fluid plenum fluidly coupling the annular flow space and the outer jacket flow passage, the inner jacket flow passage fluidly coupling the outer jacket flow passage and an exit conduit.

In some embodiments, the electromechanical flywheel above wherein: the stator support has a large diameter section and a small diameter section; the heat rejecting sections of the heat rods are thermally coupled to the large diameter section of the stator support; the stator is fixed to the small diameter section of the stator support; and, the diameters of the large and small diameter sections of the stator support are chosen to enable the use of straight heat rods.

And, in some embodiments, the electromechanical flywheel above further comprises an inner wall of the large diameter section of the stator support; and, the inner wall supporting a plurality of fins for extending the heat transfer surface of the inner wall. And in some embodiments, the heat rods are elongated metallic rods. And, in some embodiments the heat rods are heat pipes.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

FIG. 5A shows rotor poles of an electromechanical flywheel machine of FIG. 1.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Figure 1:
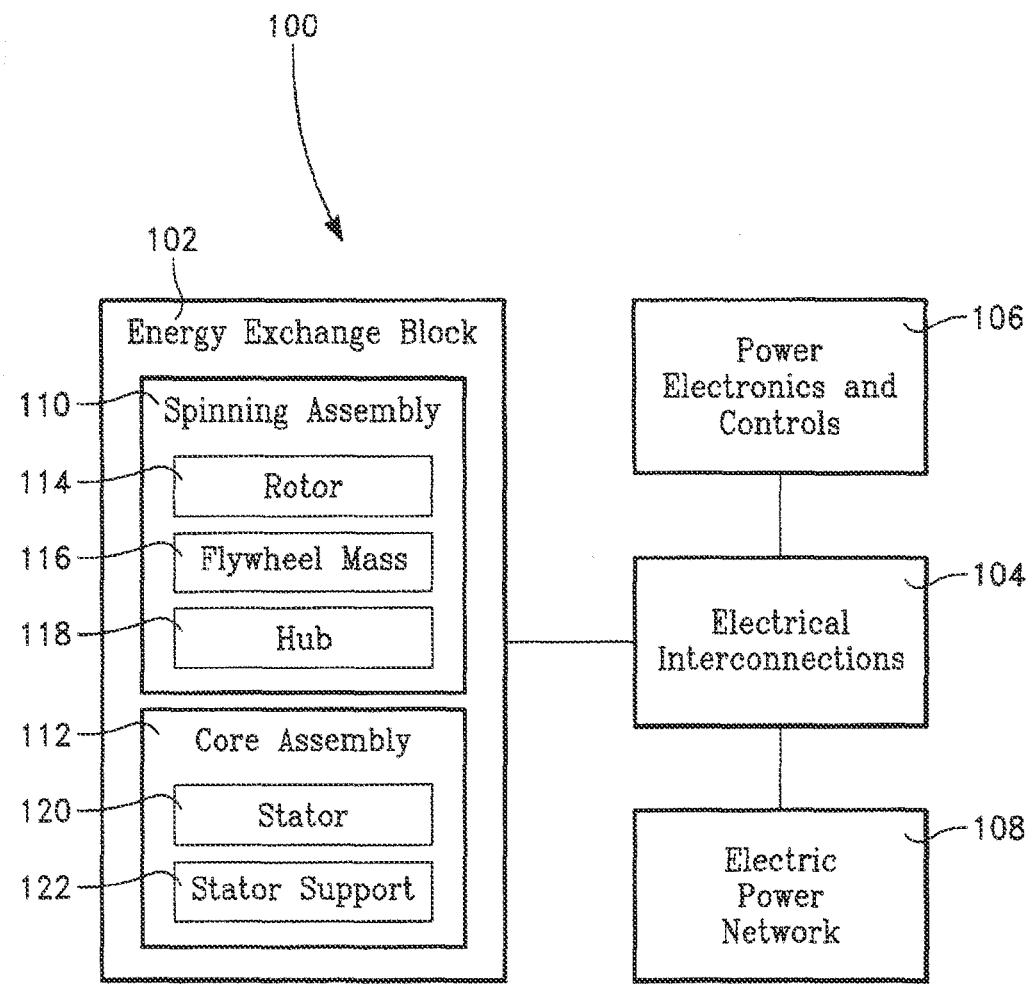
FIG. 1 shows a block diagram of an electromechanical flywheel machine in accordance with the present invention.

FIG. 1 shows an electromechanical flywheel machine 100. Electrical interconnections 104 electrically couple an energy exchange block 102, power electronics and controls 106, and an electric power network 108.

As used herein, unless otherwise stated, the term coupled refers to a direct or indirect connection such as A connected directly to B and C connected indirectly to E via D.

The energy exchange block 102 includes a spinning assembly 110 and a core assembly 112. The spinning assembly includes a motor-generator rotor 114, a flywheel mass 116, and a hub 118. The core assembly includes a motor-generator stator 120 and a motor-generator stator support 122. In various embodiments, the spinning assembly is, as shown here, shaft-less.

Electrical interconnections 104 include any of electrical conductor connections, electrical interface devices, electrical transducers, and the like. Power electronics and controls 106 include any of silicon and/or semiconductor devices, analog and digital processors, and related interfaces including human interfaces. The electric power network 108 is 1) a source of electric power to the energy exchange block 102 in some embodiments, 2) a user of electric power from the energy exchange block in some embodiments, and 3) both a source and a user of electric power to and from the energy exchange block in some embodiments.

Figure 2:
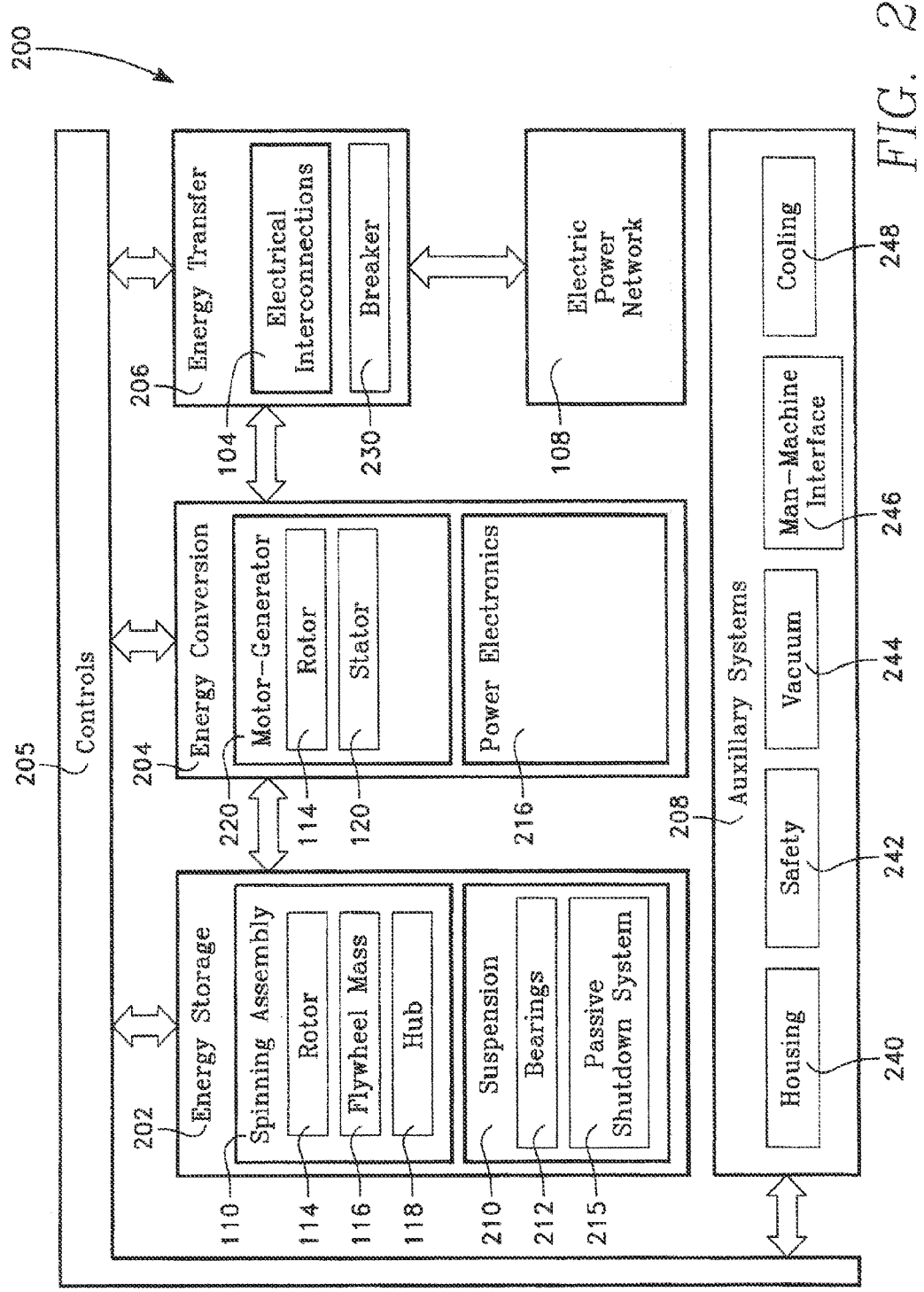
FIG. 2 shows selected functions and equipment of the electromechanical flywheel machine of FIG. 1.

FIG. 2 shows selected electromechanical flywheel machine functions and equipment 200. Energy storage 202 is central to flywheel operation. In electromechanical flywheels, energy storage and energy conversion 204 provide a means for converting kinetic energy to electrical power and/or converting electrical power to kinetic energy. Energy transfer 206 provides for electric power transfers between energy conversion equipment 220, 216 and an electric power network 108. In various embodiments, an electrical switch such a circuit breaker 230 provides for connecting and disconnecting conductors enabling power transfer. In various embodiments, other electromechanical flywheel machine functions include any of several auxiliary support functions 208 described below.

Energy storage 202 utilizes the spinning assembly 110. In various embodiments, a suspension system 210 supports the spinning assembly. Suspension equipment includes bearings or their equivalents 212 and in some embodiments a passive shutdown system 215 supports the spinning assembly in selected operating regimes such as shutdown.

Energy conversion 204 utilizes a means for converting kinetic energy into electrical power such as a generator or a motor-generator. A motor-generator 220 is shown. The motor-generator includes the rotor 114 and a stator 120 and provides a means for rotatably driving the spinning assembly 110 and for being rotatably driven by the spinning assembly. In various embodiments, power electronics 216 enable manipulation of electrical waveforms emanating from the motor-generator and/or the electric power network 108. For example, in various embodiments, power electronics provide for frequency conversion in an AC to AC converter having an intermediate DC bus and power electronics provide for variable speed drive functions such as accelerating the flywheel rotor.

In various embodiments, auxiliary support functions 208 are carried out by auxiliary support equipment described more fully below. Auxiliary support functions include housing 240, safety 242, vacuum 244, cooling 248, and man-machine interface 246.

A control function 205 provides for one or more of monitoring, assessment, command, and control of other electromechanical flywheel functions. In particular, the control function enables electromechanical flywheel operation via supervision and/or control of one or more of the energy storage 202, energy conversion 204, energy transfer 206, and auxiliary support 208 functions.

Figure 3:
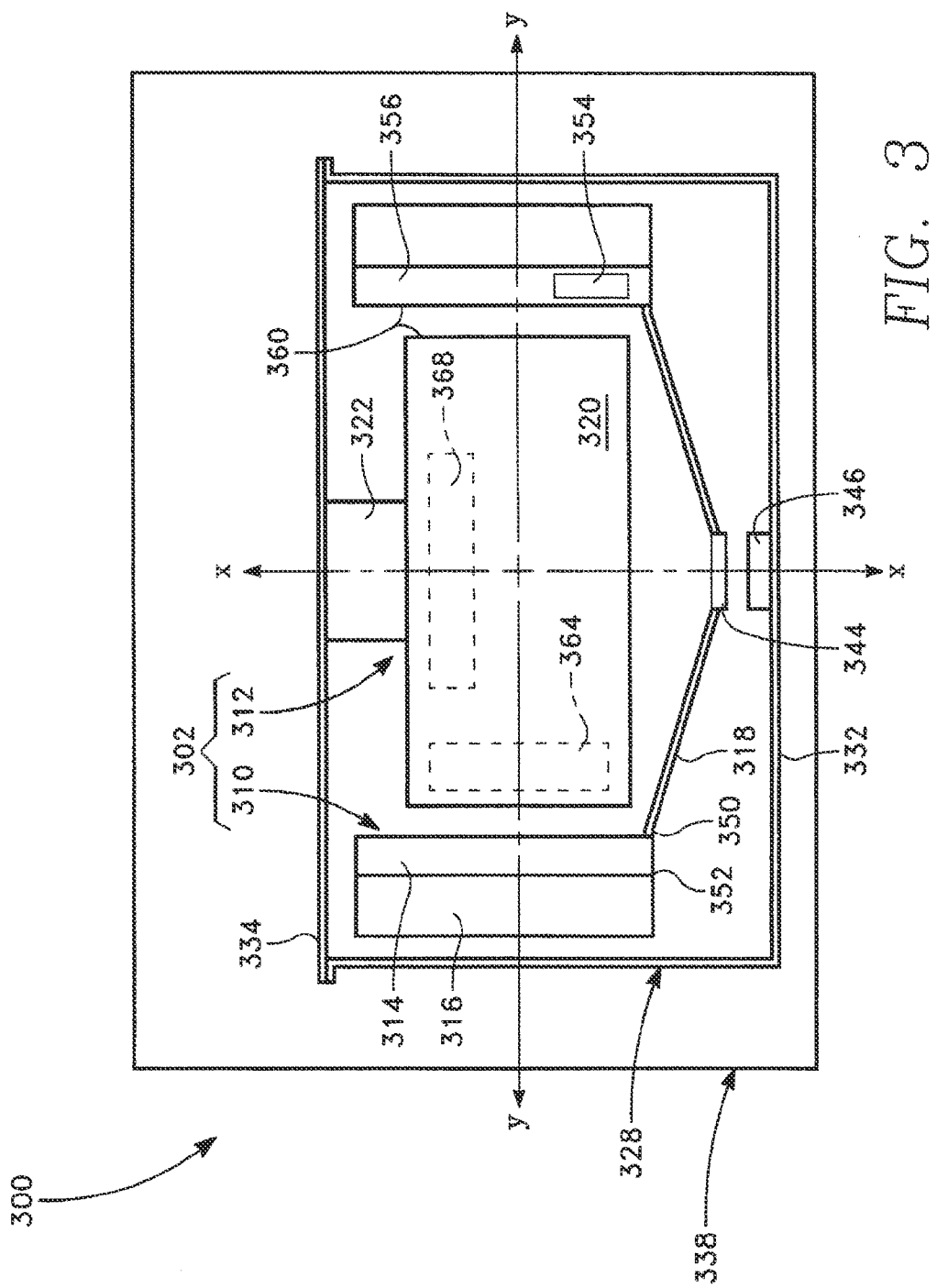
FIG. 3 shows a first embodiment of the electromechanical flywheel machine of FIG. 1.

FIG. 3 shows a first electromechanical flywheel portion 300. An energy exchange block 302 is enclosed by an inner housing 328 which is in turn enclosed by an optional outer housing 338.

The energy exchange block 302 includes a spinning assembly 310 and a core assembly 312. Included in the spinning assembly is a motor-generator rotor 314, a flywheel mass encircling and coupled to the rotor 316, a hub 318 coupled to the flywheel mass, and a moving suspension element 344. In some embodiments, a sleeve such as a non-magnetic sleeve is interposed between the rotor and the flywheel mass for, inter alia, backing the rotor and providing support to the rotor. The rotor, flywheel mass, hub, and moving suspension element are for rotation in synchrony about an axis x-x and in various embodiments the hub is attached to one or both of the rotor 350 and the flywheel mass 352. Opposite the moving suspension element is a stationery suspension element 346 supported via a first wall of the inner housing 332. Included in the core assembly 312 are a stator 320 and a stator support 322. In some embodiments the stator support is coupled to a wall of the inner housing such as a second wall of the inner housing 334.

Encircling the motor-generator stator 320 is the motor-generator rotor 314. In various embodiments, the rotor 314 includes magnetic 354 and nonmagnetic 356 portions and, in some embodiments, the nonmagnetic portion is or includes blocking or matrix material supporting the magnetic portions. In an embodiment, the magnetic rotor portions are laminated structures.

In various embodiments the stator 320 includes a magnetic structure with one or more interengaged coils having electrically conductive windings capable of carrying variable currents and thereby varying the magnetic flux of the magnetic structure. In some embodiments, a first stator coil 364 encircles an imaginary y-y axis that is about perpendicular to the x-x axis. And, in some embodiments, a second stator coil 368 encircles the x-x axis. In an embodiment, a plurality of first stator coils encircle respective imaginary y-y axes and one or more second stator coils encircle the x-x axis, the first stator coils being armature coils and the second stator coils being field coils.

And, in an embodiment, the motor-generator 360 is a homopolar device with the illustrated inside-out arrangement (rotor encircles stator) wherein a) a rotatable rotor similar to rotor 314 includes coil-less, laminated magnetic structures, b) wherein a stationery central stator similar to stator 320 includes laminated magnetic structures with coils for creating a magnetic flux in the magnetic structures and c) the rotor encircles the stator.

Figure 4:
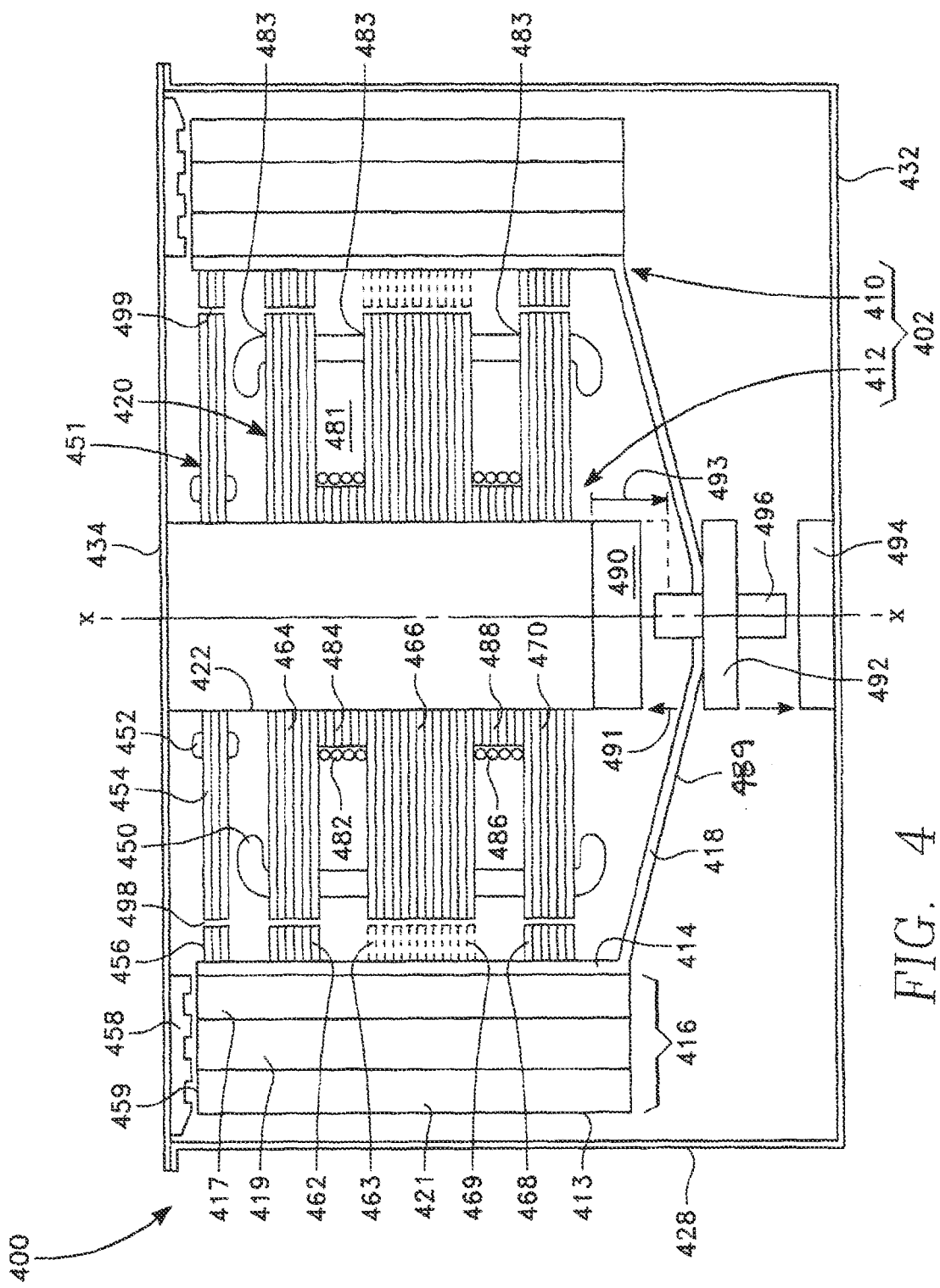
FIG. 4 shows a second embodiment of the electromechanical flywheel machine of FIG. 1.

FIG. 4 shows a second electromechanical flywheel portion 400. An energy exchange block 402 is enclosed by an inner housing 428 which is enclosed, or partially enclosed, in some embodiments, by an outer housing (not shown).

The energy exchange block 402 includes a spinning assembly 410 and a core assembly 412. Included in the spinning assembly are a motor-generator rotor 414, a flywheel mass encircling and coupled to the rotor 416, a hub coupled to the flywheel mass 418, a support pin for supporting the hub 496, and a moving suspension assembly for supporting the hub 492. Some embodiments include a sleeve such as a non-magnetic sleeve between the rotor and the flywheel mass.

In various embodiments, the flywheel mass 416 includes layers of different materials such as fiberglass in one or more types or grades and carbon fiber in one or more types or grades. U.S. Pat. No. 6,175,172 entitled HUB AND CYLINDER DESIGN FOR FLYWHEEL SYSTEM FOR MOBILE ENERGY STORAGE is incorporated by reference herein in its entirety and for all purposes including flywheel mass construction techniques and materials.

As shown, the flywheel mass includes three layers with a first layer 417 adjacent to the rotor, an intermediate layer 419, and an outer layer 421. In an embodiment, the intermediate and outer layers include carbon fiber materials and the inner layer includes fiberglass. In another embodiment, all three layers are substantially made from carbon fiber materials. In various embodiments, one or more layers are pre-stressed such as by winding fibers under tension to form substantially cylindrical shell(s) with inherent compressive stress.

The support pin, moving suspension assembly and hub are concentrically arranged and are for rotation in synchrony about an axis x-x. As seen, the support pin 496 is located in a gap 491 between upper and lower bearing carriers 490, 494. Extending from the stator support 422 is an upper bearing carrier and supported from a first wall of the housing 432 is a lower bearing carrier. In an embodiment, elongation of the upper bearing carrier along the x-x axis 493 serves to rotatably restrain the support pin between the upper and lower bearing carriers. In this sense, the upper and lower bearing carriers provide a means to "capture" the spinning assembly 410 via the support pin and are useful for functions including passive shutdown. In various embodiments, the lower bearing carrier and the moving suspension assembly incorporate a first electromagnetic bearing.

A second electromagnetic bearing 451 is spaced apart from the upper and lower bearing carriers 490, 494. The second electromagnetic bearing includes a fixed bearing stator 454 supported by the stator support 422 and electrical windings 452 for magnetizing the stator and a geometrically opposing rotor 456 coupled to the rotor. As shown, the mating faces of the electromagnet 498, 499 are parallel to the x-x axis such that electromagnetic bearing forces are perpendicular to the x-x axis. In other embodiments, angled electromagnetic bearing faces such as those described infra provide electromagnetic bearing force components along an axis parallel to the x-x axis and along an axis perpendicular to the x-x axis.

Included in the core assembly 412 is a stator 420 and a stator support 422 coupled to a second wall of the inner housing 434. Encircling the motor-generator stator is the motor-generator rotor 414. In various embodiments, the rotor includes magnetic and nonmagnetic portions (e.g., see 354, 356 of FIG. 3) and, in some embodiments, the non-magnetic portion is or includes blocking or matrix material supporting the magnetic portions. In an embodiment, the magnetic rotor portions are laminated structures.

In various embodiments, the stator 420 includes a magnetic structure with one or more interengaged coils having electrically conductive windings capable of carrying variable currents and thereby varying the magnetic flux of the magnetic structure.

A typical homopolar stator includes at least two peripheral rims and one smaller intermediate rim. The rims include a magnetic material such as iron and in various embodiments the rims are laminated structures with each laminate having a substantially annular shape.

As shown, the stator 420 includes three large diameter rims 464, 466, 470 and two smaller diameter rims 484, 488 such that substantially annular or somewhat doughnut shaped pockets 481 are formed between the large diameter and the small diameter rims. It is in these pockets that coils encircling the rotational axis x-x are placed to form field windings 482, 486. In addition to the field coil(s), the stator also includes armature coils.

Armature coils 450 are interengaged with slots 483 in the periphery of the large rims 464, 466, 470 such that each armature coil will encircle an imaginary axis y-y that is substantially perpendicular to the axis of rotation x-x (see FIG. 3).

For each stator rim, there is a plurality of mating rotor poles. As can be seen, the peripheral stator rims 464, 470 have axially spaced (x-x) mating rotor pole 462, 468 (shown in solid lines) and the central stator rim 466 has axially adjacent mating rotor poles 463, 469 (shown in broken lines). Rotor poles for adjacent rims (e.g., 462, 463) are not only axially spaced (x-x), but they are also radially spaced such that a rotor pole for one rim is radially spaced by 90 electrical degrees from the closest rotor pole mating with an adjacent rim.

In various embodiments, internal vacuum pumps such as molecular drag pumps provide for moving molecules away from the flywheel mass 416 and especially away from the flywheel mass periphery where the highest speeds are achieved. U.S. Pat. No. 5,462,402 FLYWHEEL WITH MOLECULAR PUMP is incorporated by reference herein in its entirety and for all purposes including its discussion of molecular drag pumps and their incorporation into flywheel systems.

In an embodiment, a first vacuum pump is formed by a stationery labyrinth like ring 458 supported from the housing wall 434 which is closely spaced with respect to a vacuum pump surface of the flywheel mass 459. In various embodiments grooves in the labyrinth ring provide for a pumping action in concert with the moving flywheel surface. In some embodiments, the groove is a spiral having a cross-sectional area that generally decreases along a forward flow path. And, in some embodiments, a second vacuum pump is formed by a labyrinth similar to the one described above and fixed to peripheral stator parts (such as the large diameter stator rings 454, 464, 466, 470, not shown for clarity) or fixed to geometrically opposed rotor poles (456, 462, 463, 469, 468).

In an embodiment, a supply region and an exhaust region are included within the evacuable housing. The supply region has a boundary defined at least in part by portions of a housing 428, a hub exterior surface 417, and a flywheel mass periphery 413. The exhaust region has a boundary defined at least in part by portions of the vacuum barrier housing and the core assembly 412. A first drag pump is interposed between a flywheel mass surface 459 and the vacuum barrier housing wall 434 and a second drag pump is interposed between at least one stator ring 466 and the rotor 414.

FIG. 5A shows a radially staggered arrangement of rotor poles in adjacent pole planes for a 2+2 pole single stage homopolar machine 500A. Referring to rotor cross section 502 and rotor 514, a first pole 462 is located in a first pole plane Y1 and an opposed pole 463 in located in the same plane. In a similarly clocked adjacent pole plane Y2, an adjacent plane pole 465 is between the Y1 plane poles. Not shown in this cross section is the second pole in the Y2 plane 464.

The plane views 504, 506 of the pole planes Y1, Y2 show the poles in each pole plane 462, 463 and 464, 465 are separated by a 90° geometric angle. In this 4 pole embodiment, the poles are similarly separated by 90 electrical degrees.

In various embodiments, a magnetic path extends between adjacent staggered poles. For example, as shown in the pole assemblies 508, 510, magnetic path parts 466, 468 extend between pole pairs 462, 463 and 465, 464. As shown here, two continuous magnetic paths are formed in a 4 pole machine rotor by magnetic path parts 462-466-465 and 463-468-464. In some embodiments, each magnetic path part assembly 462-466-465 and 463-468-464 is "Z" shaped with the central members 466, 468 meeting adjoining members 462, 465 and 465, 464 at substantially right angles. Among other things, this structure preserves the capacity of the magnetic path.

Figure 5B:
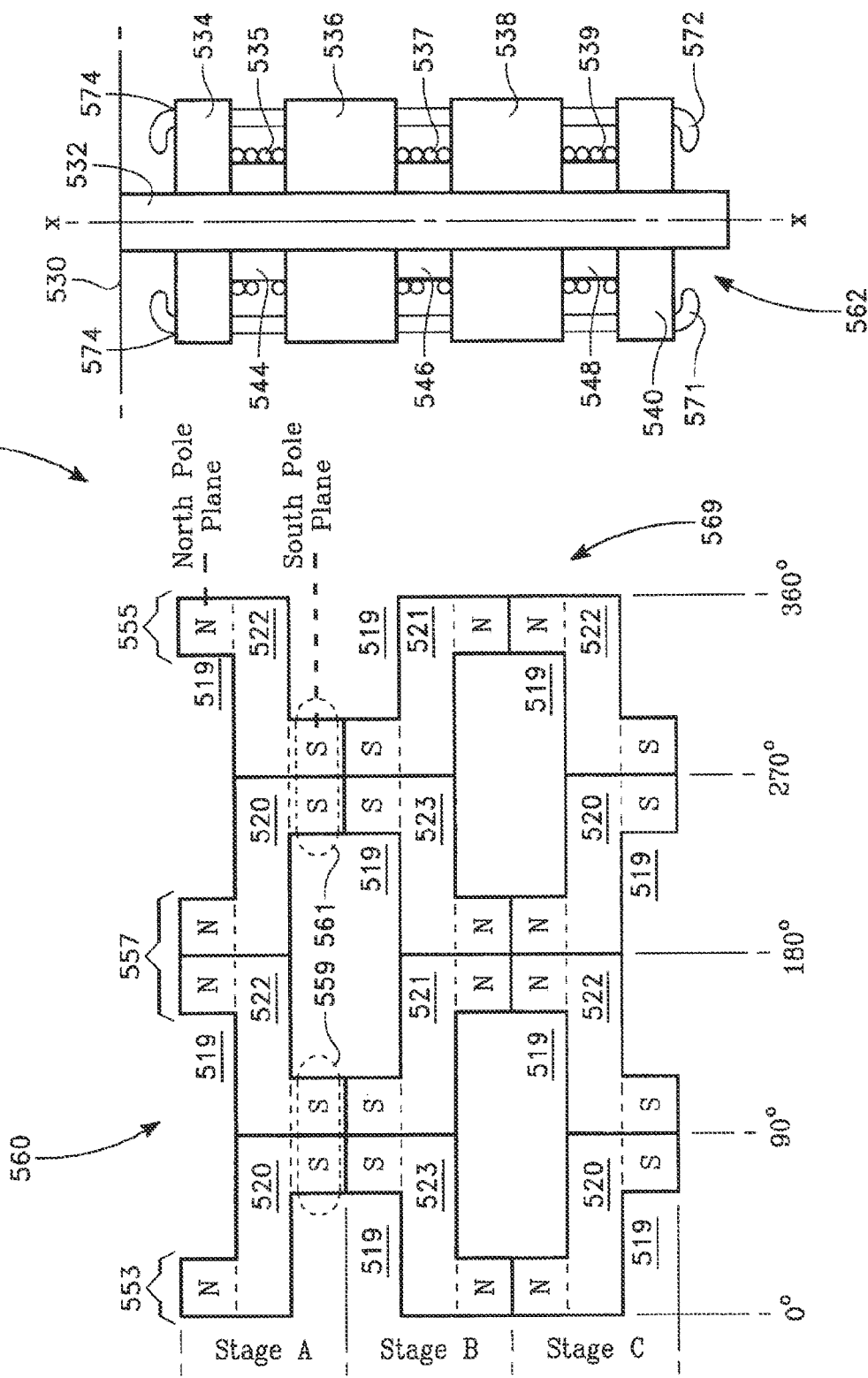
FIG. 5B shows rotor poles and a stator of an electromechanical flywheel machine of FIG. 1.

FIG. 5B shows a rotor and a stator for a three stage machine, each stage having four poles 500B. Here, a view of rotor magnetic path part assemblies 560 is shown as if the normally cylindrical rotor structure is "unrolled" such that a planar surface is presented. The magnetic path part assemblies 520, 522, 523, 521 are arranged to create a lattice 569 with spaces between the parts 519, the spaces being filled, in various embodiments, with non-magnetic material(s).

The lattice 569 is constructed such that a plurality of stages A, B, C is formed, each stage having 4 poles. For example, stage A has a North plane with a first full pole 557 and a second pole consisting of two half-poles 553, 555. Stage A also has a South plane with two full poles 559, 560. The North and South planes of Stage A therefore have a total of 4 complete poles.

Each stage includes four magnetic path part assemblies or rotor lattice parts. For example, Stage A includes magnetic path part assemblies 520, 522, 520, and 522; Stage B includes magnetic path part assemblies 523, 521, 523, and 521; and Stage C, like Stage A, includes magnetic path part assemblies 520, 522, 520 and 522. Notably, in various embodiments, the path part assemblies differ only in their orientation; for example, assembly 520 differs from assembly 522 by an 180° rotation about an axis parallel to the x-x axis while assembly 520 differs from assembly 523 by an 180° rotation about an axis perpendicular to the x-x axis. Assembly 522 differs from assembly 521 by an 180° rotation about an axis perpendicular to the x-x axis.

Also shown is a cross sectional view of a stator 562. As seen, the stator has large 534, 536, 538, 540 and small 544, 546, 548 diameter rims centered on an x-x axis. First and second large diameter intermediate rims 536, 538 are interposed between large diameter peripheral rims 534, 540. One small diameter rim is interposed between each pair of large diameter rims such that the rims are stacked in an order 534, 544, 536, 546, 538, 548, and 540. The rims are supported by a coupled stator support 532 that is supported via a wall 530.

A plurality of armature windings eg. 571, 572 interengage a plurality of the large diameter rim peripheries eg. 574 via slots or a similar feature. Field windings 535, 537, 539 encircle the stator axis of rotation x-x with one field winding encircling each of the small diameter rims such that each field winding is between a pair of large diameter rims.

As can be seen, the lattice structure of the rotor 569 is arranged such that the first rim of the stator 534 corresponds to the North poles of stage A; the third rim of the stator 536 corresponds to the South poles of stage A and the South poles of stage B; the fifth rim of the stator corresponds to the North poles of stage B and the North poles of stage C; and, the seventh rim of the stator corresponds to the South poles of stage C.

In various embodiments, bearings are used to support the spinning assembly and the included flywheel mass 116, 316, 416. Any combination of the bearings described herein that is sufficient to support the spinning assembly may be used.

Figure 6:
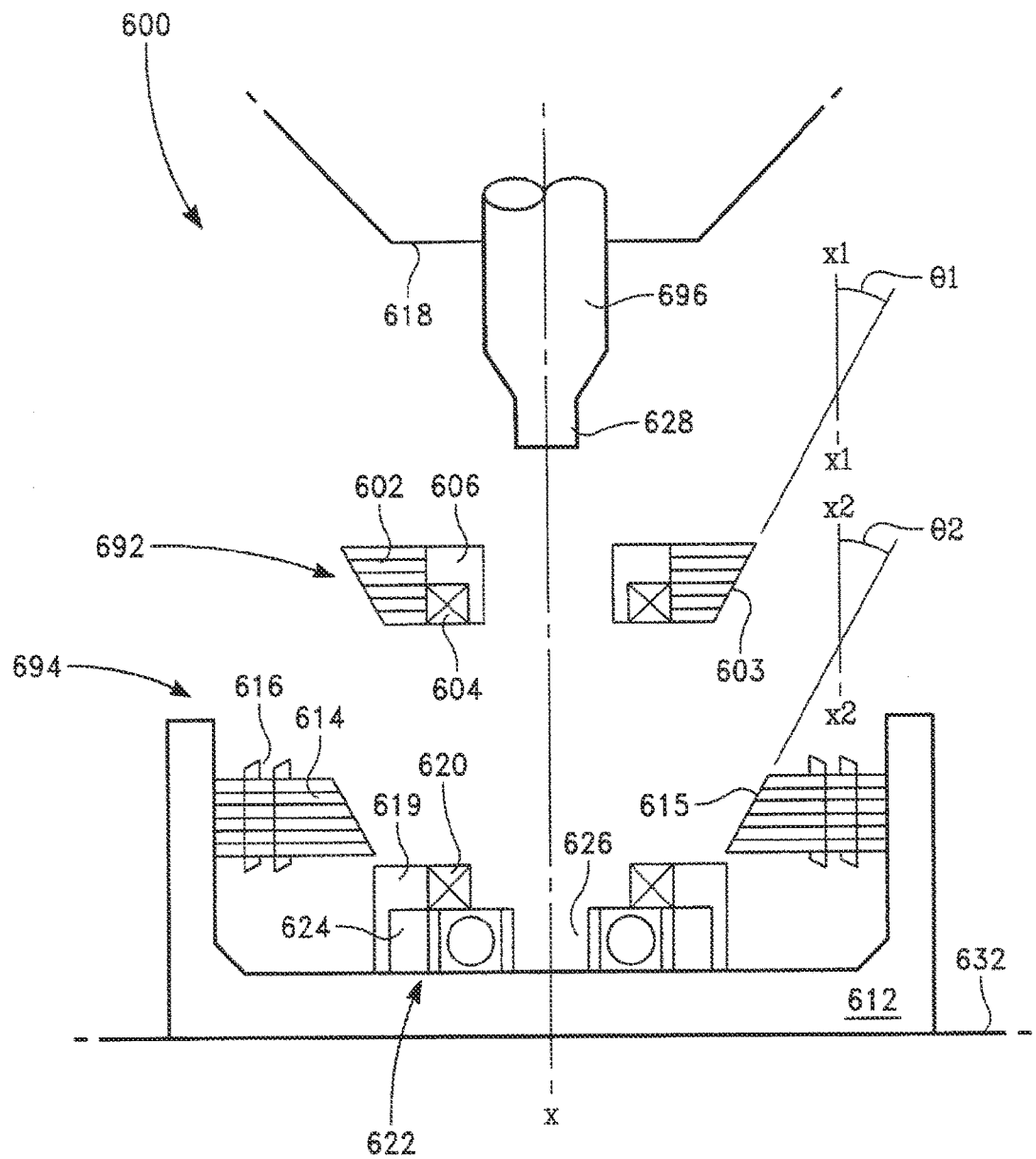
FIG. 6 shows a lower bearing assembly and some related parts of an electromechanical flywheel machine of FIG. 1.

FIG. 6 shows a lower bearing carrier and some related parts 600. As shown in the upper half of the drawing, there is a hub 618 for coupling to a flywheel mass, a support pin 696 for supporting the hub 618, a moving suspension assembly for supporting the hub 692, and a lower bearing carrier 694. The hub, support pin, and moving suspension assembly are fixedly coupled together (shown in FIG. 6 in exploded diagram format for clarity).

In various embodiments, the moving suspension assembly 692 includes a moving suspension assembly electromagnetic bearing rotor 602. In some embodiments, the bearing rotor is a laminated structure (as shown). In some embodiments, the bearing has a moving suspension assembly electromagnetic bearing face 603 oriented at an angle θ1=0° where the angle is defined by the face and an axis x1-x1 parallel to the x-x axis. And, in some embodiments, the bearing has a face 603 oriented at an angle 0<θ1<90° ("angled face") (as shown) providing electromagnetic bearing force components parallel to the x-x axis and parallel to an axis perpendicular to the x-x axis.

In various embodiments, the moving suspension assembly 692 includes a moving suspension assembly permanent magnet 604 and in some embodiments the permanent magnet is in addition to the electromagnetic bearing rotor 602. And, in some embodiments, a moving suspension assembly magnet holder 606 provides a holder for either or both of the moving suspension assembly electromagnetic bearing rotor and the moving suspension assembly permanent magnet.

When the moving suspension assembly includes an electromagnetic bearing rotor 602, the lower bearing carrier 694 includes a corresponding lower bearing carrier electromagnetic bearing stator 614 and a lower bearing carrier stator electrical coil 616 for magnetizing the stator. The stator is supported by a lower bearing carrier frame 612 which is in turn supported by a housing wall 632.

In some embodiments, the bearing stator is a laminated structure (as shown). In some embodiments, the bearing has a lower bearing carrier electromagnetic bearing face 615 oriented at an angle θ2=0° where the angle is defined by the face and an axis x2-x2 parallel to the x-x axis. And, in some embodiments, the bearing has a face 615 oriented at an angle 0<θ2<90° ("angled face") (as shown) providing electromagnetic bearing magnetic force components parallel to the x-x axis and parallel to an axis perpendicular to the x-x axis. As will be appreciated by persons of ordinary skill in the art, the bearing faces 603, 615 interoperate such that a straight rotor face is matched with a straight stator face while an angled rotor face is matched with an angled rotor face.

Where a moving suspension assembly permanent magnet is used 604, the lower bearing carrier includes a geometrically opposed permanent magnet 620. In some embodiments a lower bearing carrier permanent magnet holder 619 supported from the lower bearing carrier frame 612 and supporting the permanent magnet.

In various embodiments, the lower bearing carrier 694 includes a lower bearing carrier landing bearing such as an antifriction bearing 622. As shown, the landing bearing is supported from the lower bearing carrier frame 612. In some embodiments, a damping material 624 provides a seating material for the landing bearing.

Figure 7:
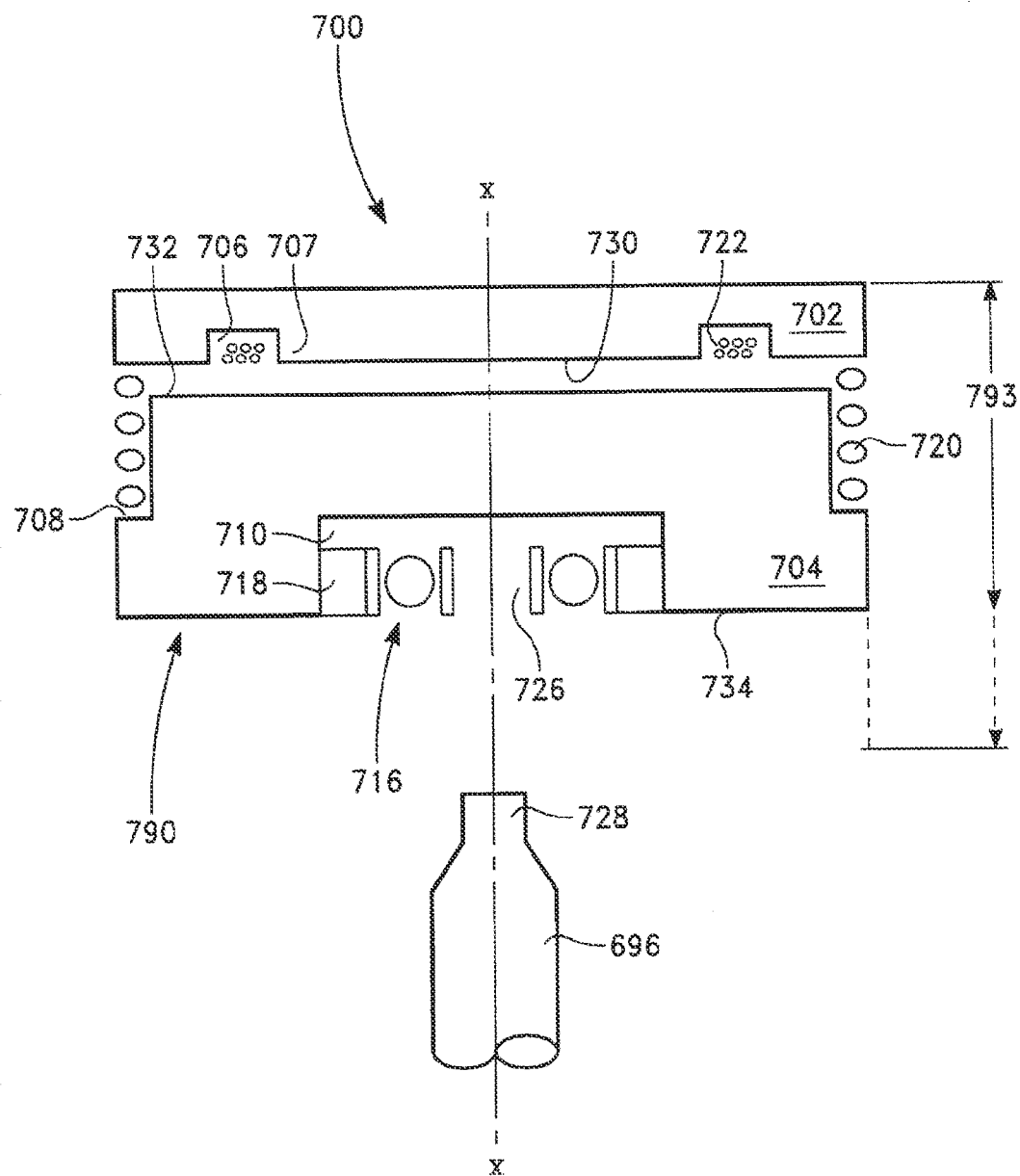
FIG. 7 shows an upper bearing assembly and some related parts of an electromechanical flywheel machine of FIG. 1.

FIG. 7 shows an upper bearing carrier and some related parts 700. As shown, the upper bearing carrier 790 includes a stationery plate 702 and a moving plate 704.

The stationery plate 702 includes a coil space 706 in the form of a groove is on a side of the stationery plate facing the moving plate 730. An electrical coil 722 for magnetizing a magnetic material surrounded by the coil 707 is included.

The moving plate 704 includes a spring space 708 and a mechanical bearing space 710. The spring space 708 is formed where a reduced diameter section of the moving plate extends to the side of the plate facing the stationery plate 732 and a spring such as a coil spring 720 occupies this space. The bearing space 710 is a central cavity in a moving plate surface 734 opposite the moving plate surface facing the stationery plate 732. As seen, operation of this electromagnet compresses the spring and tends to draw the plates together.

In various embodiments, the upper bearing carrier 790 includes an upper bearing carrier landing bearing such as an antifriction bearing 716. As shown, the landing bearing is positioned in the moving plate cavity 710. In some embodiments, a damping material 718 provides a seating material for the landing bearing.

As seen in FIGS. 6 and 7, the support pin 696 extends between the upper bearing carrier 790 and the lower bearing carrier 694. Further, each of the upper bearing carrier landing bearing 716, support pin 696, moving suspension assembly 692, lower electromagnetic bearing stator 614, lower bearing carrier permanent magnet 620, and lower bearing carrier landing bearing 622 is centered on the x-x axis such that when the moving plate 704 moves toward the lower bearing carrier 793, the support pin upper and lower ends 728, 628 are engaged with respective upper and lower landing bearings 716, 622 and a central aperture of each landing bearing 726, 626.

Figure 8:
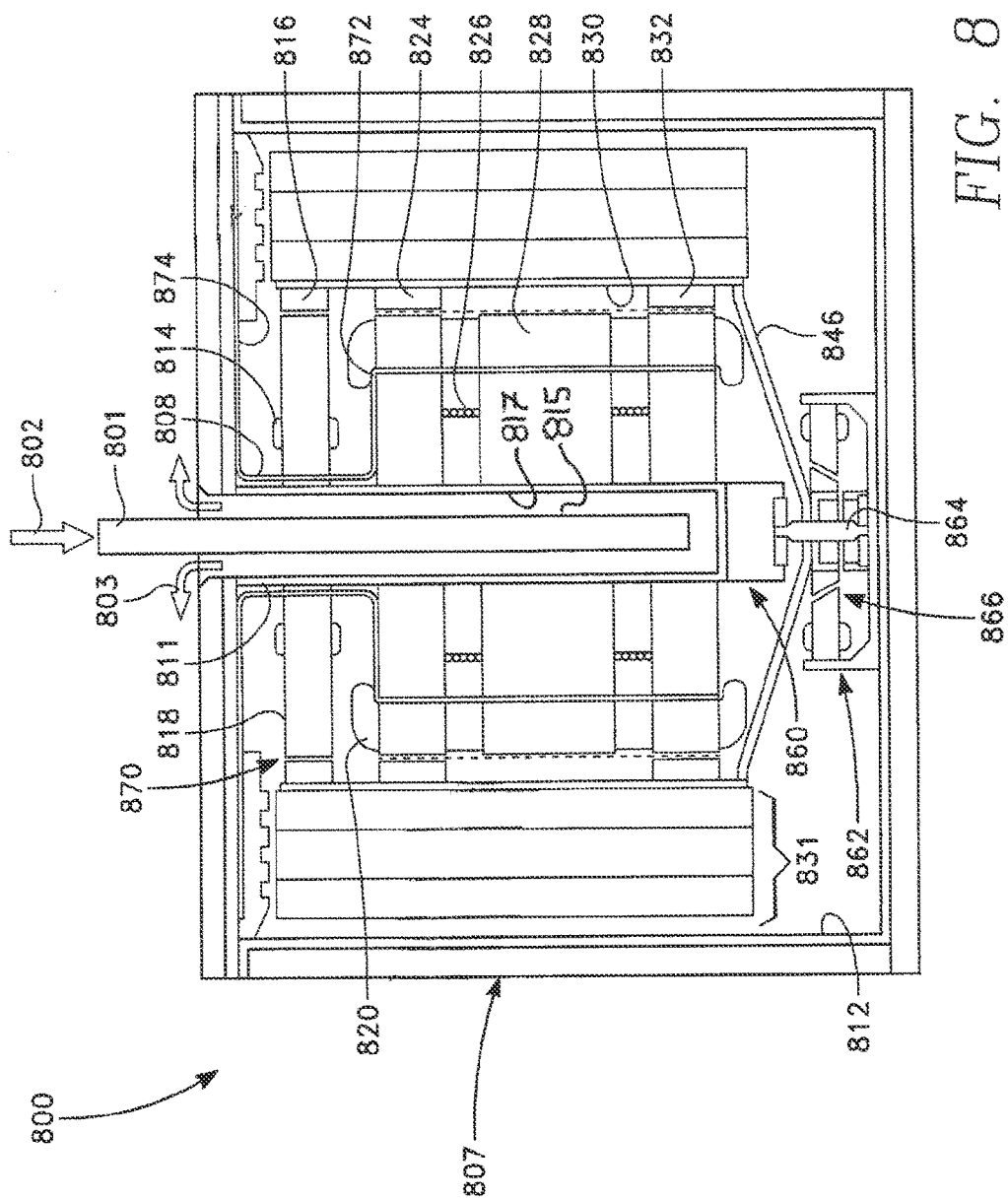
FIG. 8 shows a third embodiment of the electromechanical flywheel machine of FIG. 1.

FIG. 8 shows another embodiment of an electromechanical flywheel 800. A flywheel mass 831 surrounds and is coupled to a homopolar motor-generator rotor including a metallic liner 830. As shown, the rotor includes rotor North rotor poles 824, 832. Not shown are the South rotor poles; see stages A and B of FIG. 5B for a similar arrangement that locates the South rotor poles.

A stator support 811 is coupled to a motor-generator stator 828 and each of field windings 826 and armature windings 820 are interengaged with the stator in a manner similar to that described above.

Supporting the rotor 830 and flywheel mass 831 is a hub 846 that is in turn supported by a support pin 864 engaging and/or located between upper and lower bearing carriers 860, 862. See FIGS. 6 and 7 for details of similar bearing carriers. A first electromagnetic bearing 866 is located in the lower bearing carrier. A second electromagnetic bearing 870 is spaced apart from the first and second bearing carriers and includes a bearing stator 818, a bearing rotor 816 and stator coils 814 for magnetizing the stator.

Electromechanical flywheel housing includes an inner vacuum barrier 812. In some embodiments, an outer housing 807 supports the vacuum barrier. Suitable vacuum barrier materials include stainless steel and other materials known by skilled artisans to be suited to this purpose.

In various embodiments, the stator support 811 has a tubular structure and a coolant entry conduit tube 801 is located therein. As shown, the coolant entry conduit contains a liquid coolant flow entering the stator support 802. An annulus between the support structure inside diameter 817 and the coolant entry conduit outside diameter 815 provides a flow path for coolant leaving the stator support 803. Coolant traveling through the annulus absorbs heat from the stator 828 and is in various embodiments cooled in a cooler (not shown) before it is pumped (not shown) back into the flow entryway 802.

In some embodiments, heat pipes 808 provide and/or enhance stator cooling. As shown, each of a plurality of heat pipes has a heat absorbing first end in close proximity to the stator, such as in the stator armature winding slots (as shown) 872. The heat rejecting end of the heat pipe is in close proximity to the vacuum barrier, such as in contact with vacuum barrier (as shown) 874 or in other embodiments cooled by the above mentioned liquid coolant flow.

In various embodiments, electromechanical flywheels disclosed herein employ a cooling system including a fluid heat transfer medium. For example, some cooling system embodiments utilize the stator support 811 as a fluid cooled heat exchanger as described above. As used in the context of cooling systems herein, fluids include liquids, gasses, and mixtures thereof such as condensing vapor.

Electromechanical flywheel cooling systems incorporating a fluid transfer medium are further described below.

Figure 9A:
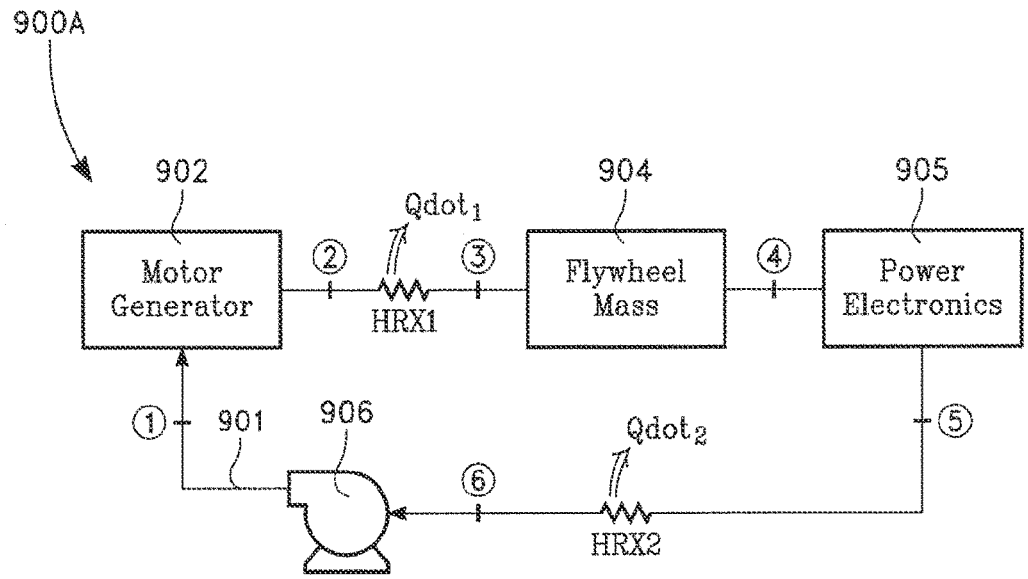
FIG. 9A shows a schematic diagram of a first electromechanical flywheel cooling system of the electromechanical flywheel machine of FIG. 1.

FIG. 9A shows a schematic diagram of a first electromechanical flywheel cooling system 900A. Coolant is moved in a fluid circuit 901 by a fluid pump 906. The circulating fluid absorbs heat produced by electrical and frictional losses. In particular, the fluid absorbs heat from electrical losses in the motor-generator 902 and the power electronics 905. In addition, the fluid absorbs heat from frictional/drag losses associated with the flywheel mass 904. Suitable coolant fluids include water, glycol, commercial heat transfer fluids such as DOWTHERM™ and halogenated hydrocarbons, and other suitable fluid heat transfer media known to skilled artisans.

In an embodiment, heat is removed $Qdot_1$ from the fluid in an optional first heat exchanger HRX1 after motor-generator heat losses 902 are transferred to the fluid but before flywheel mass heat losses 904 are transferred to the fluid. And, in various embodiments, heat is removed $Qdot_2$ from the fluid by a second heat exchanger HRX2 between the power electronics losses 905 and the pump 906 heat addition (if any). As used here, "Qdot" refers to a rate of heat transfer such as BTU/hr and may be alternatively indicated as a dot above the letter Q.

Figure 9B:
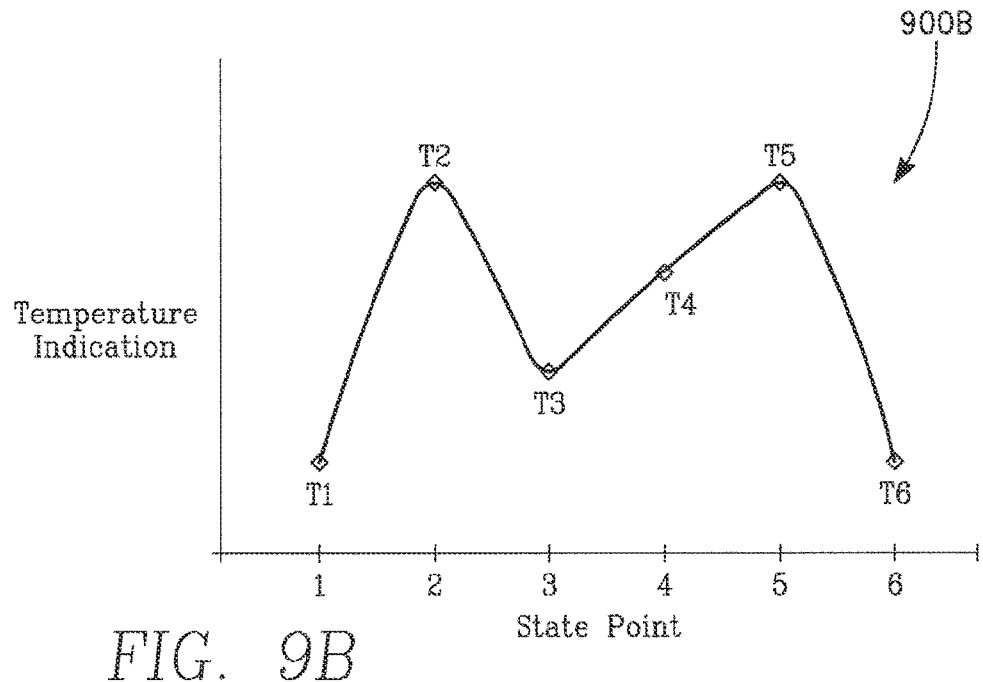
FIG. 9B shows a chart of temperature indications versus state points for the first electromechanical flywheel cooling system.

FIG. 9B shows a chart of temperature indications versus state points for the first electromechanical flywheel cooling system 900B. What follows is a description of fluid temperature changes due to heat exchange with the coolant fluid. Between state-points 1 and 2, the fluid is heated by the motor-generator losses 902 as indicated by a fluid temperature rise from T1 to T2. Between state-points 2 and 3, the fluid is cooled due to heat rejection $Qdot_1$ from heat exchanger HRX1 as indicated by a fluid temperature fall from T2 to T3.

Downstream of HRX1, between state-points 3 and 4, the fluid is heated by the flywheel drag losses 904 as indicated by a fluid temperature rise from T3 to T4. Between state-points 4 and 5, the fluid is heated by power electronics losses 905 as indicated by a fluid temperature rise from T4 to T5. Between state-points 5 and 6, the fluid is heated by pump losses 906 as indicated by a fluid temperature rise from T5 to T6. And, between state-points 6 and 1, the fluid is cooled due to heat rejection $Qdot_2$ from heat exchanger HRX2 as indicated by a fluid temperature drop from T6 to T1.

It should be noted that the above described fluid heat exchanges and resulting fluid temperature changes indicate only one of multiple possible thermal designs and only one of multiple possible sets of operating conditions. For example, another thermal design (e.g., smaller or larger HRX1) and/or different operating conditions (e.g., standby operation versus fully loaded generator), the temperature change between state-points 2 and 3 might be smaller or larger. Yet another example reverses the direction of fluid coolant flow in the fluid circuit 901. Therefore, FIG. 9B provides but one of multiple possible sets of state-points, intending to illustrate concepts consistent with the present invention through the use of specific examples, the examples not being intended to limit the generality of the disclosure.

Figure 9C:
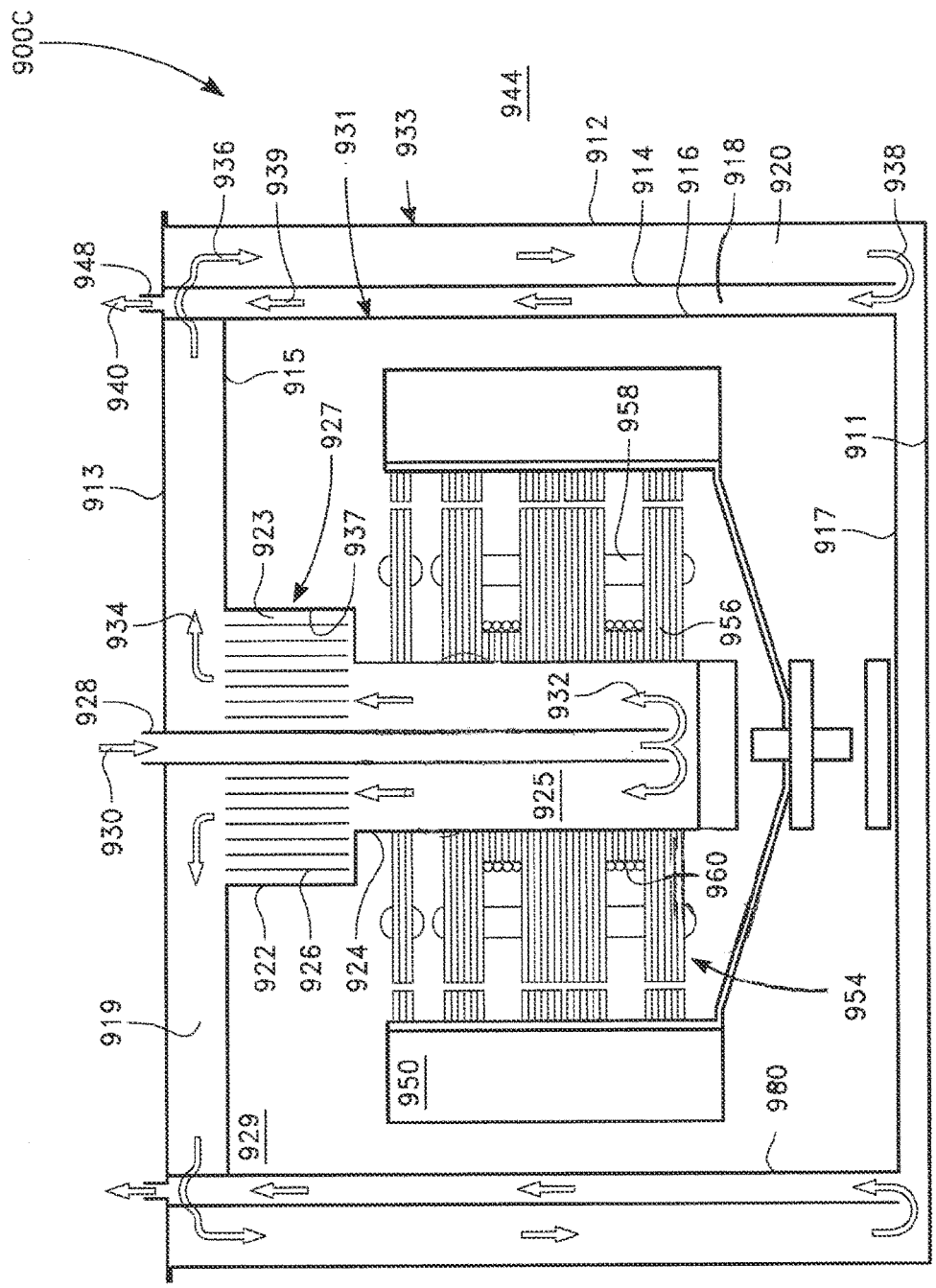
FIG. 9C shows an electromechanical flywheel of FIG. 1 with enhanced cooling provisions.

FIG. 9C shows an electromechanical flywheel with enhanced cooling provisions 900C. As shown, the stator support 927 includes a large diameter section 922 supported by an inner lid 915. The inner lid and an opposed inner floor 917 couple with opposed open ends of a circular inner wall 916 forming an innermost enclosure 931 and bounding a flywheel space 929. A circular intermediate wall 914 encircles the inner wall and a circular outer wall 912 encircles the intermediate wall. As shown, an outer jacket and an outer jacket flow passage are defined by the intermediate wall and the outer wall while an inner jacket and an inner jacket flow passage are defined by the inner wall and the intermediate wall. In various embodiments, the intermediate wall is made from a polymer such as a plastic, for example high density polyethylene.

In various embodiments, the circular intermediate wall is supported by an adjacent structure(s) such as from one of the inner or outer lids. An outer lid 913 and an opposed outer floor 911 couple with opposed open ends of the circular outer wall forming an outer enclosure 933. The inner and outer lids are spaced apart to form a fluid plenum 919 while the outer and intermediate walls define an outer flow path 920 and the intermediate and inner walls define an inner flow path 918.

The large diameter stator support section 922 adjoins a smaller diameter stator support section 924. In various embodiments, the stator sections are joined by a transition section such as a pressure recovery feature, for example a frustroconical section (not shown). Inserted through the outer 915 and inner 913 lids is a central coolant entry conduit 928 that projects through the large diameter stator support section and into the small diameter stator support section such that corresponding large 923 and small 925 annular flow passages are formed in the stator support section. In various embodiments, the large diameter stator section includes heat transfer area enhancements such as fins (as shown) 926 projecting radially inward from the large diameter stator section inner wall 937.

During operation, circulating coolant fluid absorbs heat, transports heat, and rejects heat. Originating outside the outer enclosure 933, coolant flow 930 is received by the entry conduit 928. Flow from the conduit 932 enters the annular flow passage of the small diameter stator support 925. While passing through this flow passage, the coolant absorbs heat produced by the stator 954 which is thermally coupled to the stator support 927. In particular, stator losses include armature coil 958 losses, field coil 960 losses, and core/iron 956 losses.

Flow from the small diameter flow passage 932 enters the annular flow passage of the large diameter stator support section 923. As mentioned above, some embodiments of the inner surface of this flow passage 937 include an extended heat transfer surface such as fins 926. And, as will be discussed below, the extended heat transfer surface provides enhanced heat transfer from the stator support to the coolant.

Flow from the annular flow path of the large diameter stator support section 934 enters fluid plenum 919. Flow from the fluid plenum 936 enters the outer flow passage 920. While passing through this outer flow passage the coolant rejects heat via conduction across portions of the outer enclosure 933 including the outer wall 912. In various embodiments, the outer wall rejects heat via convection to the surroundings 944.

Flow from the outer flow passage 938 enters the inner flow passage 918. While passing through this inner flow passage the coolant absorbs heat from the flywheel space 929. Sources of heat within this space include, in various embodiments, windage or drag on moving parts including the flywheel 950 and rotor iron losses. Heat transfer to the inner surface 980 of the inner wall 916 is via convection and radiation heat transfer although convective heat transfer is limited when the flywheel space is evacuated.

Flow from the inner flow passage 939 enters one or more exit conduits 948 for transporting fluid outside the outer enclosure 940. The coolant fluid is cooled before being returned to the entry conduit for another pass through the fluid circuit within the outer enclosure 933.

Heat transfer from the stator and particularly from the armature windings can be enhanced through the use of heat transferring rods "heat rods." Heat rods include heat pipes and metallic rods. While these heat pipes and metallic rods will often have a similar appearance, heat pipes are hollow structures containing a working fluid while metallic rods are typically solid metal rods made from a metal with high thermal conductivity. Suitable heat pipes include those using water as a working fluid and suitable metallic rods include those made from copper and/or aluminum.

Figure 9D:
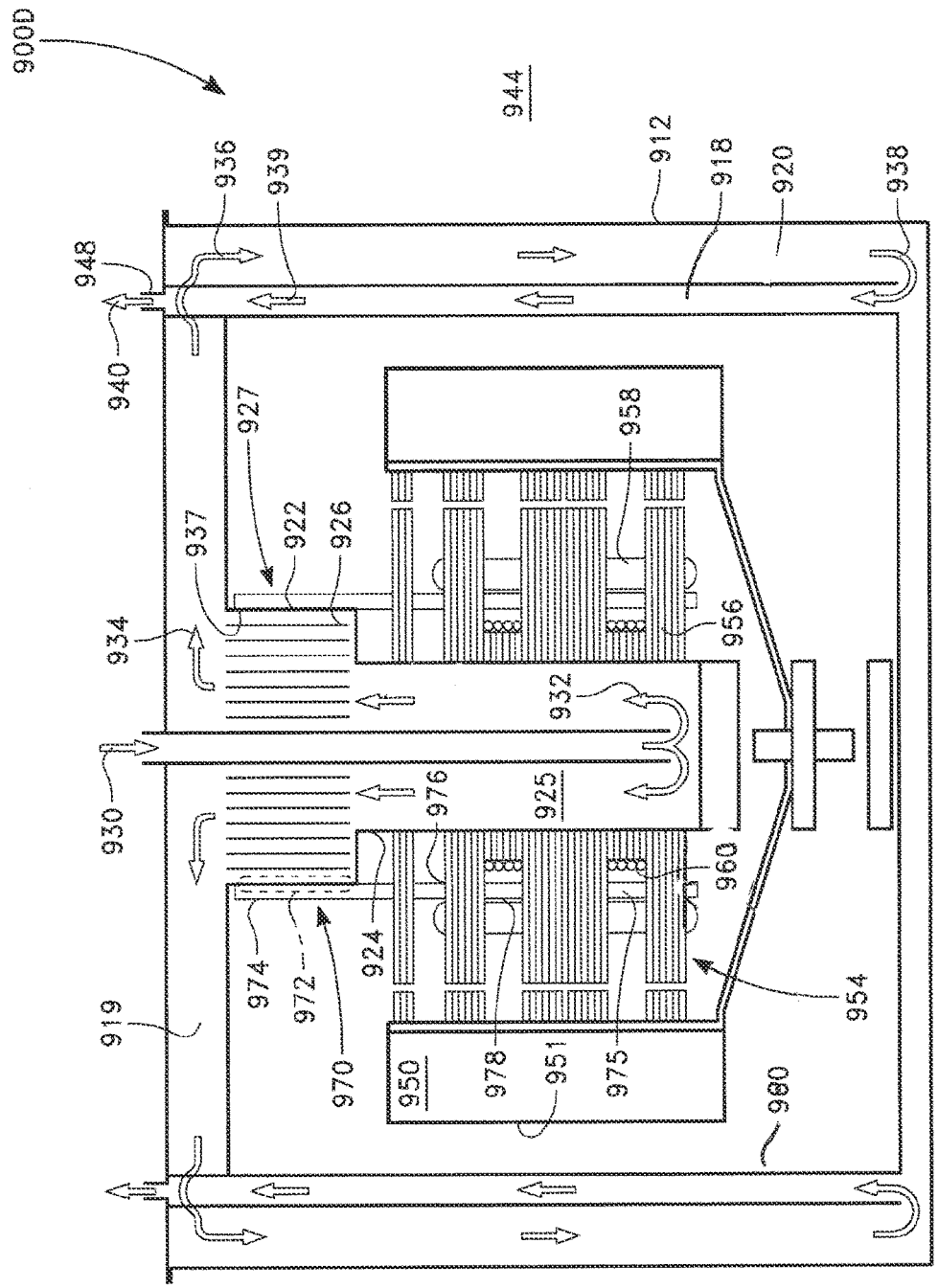
FIG. 9D shows the electromechanical flywheel of FIG. 9C with heat pipes.

FIG. 9D shows the electromechanical flywheel of FIG. 9C with heat pipes 900D. As shown, a plurality of heat pipes 970 extend from the large diameter section of the stator support 922 through respective stator slots 976. Heat absorbing ends of heat pipes 975 are seated in respective stator slots between the slot root and windings forming an armature coil 958. In various embodiments, heat transfer for cooling the stator and the armature windings is via conduction from windings to the heat pipe 978 and via conduction from the stator 956 to the heat pipe (contact areas are not shown). Notably, field windings 960 are cooled as the stator is cooled.

During stator assembly 954 cooling, heat is transported along the length of the heat pipe 970 to the heat pipe heat rejecting end 974. Heat transfer from the heat pipe to the coolant occurs via conduction 972 from the heat pipe to the large diameter section of the stator support 922 and from this section to the coolant. In various embodiments, an inner surface of the large diameter stator support section 937 provides an extended heat transfer surface such as a surface presented by parallel fins arranged to form adjacent flow paths that are substantially aligned with the direction of coolant flow 926.

In various embodiments, metallic rods are substituted for the heat pipes of FIG. 9D. In these embodiments, lesser heat transfer rates will be available as compared with heat pipe embodiments and therefore, the time between flywheel discharge events will typically increase to provide more time for heat transfer from the stator to the coolant fluid.

Figure 9E:
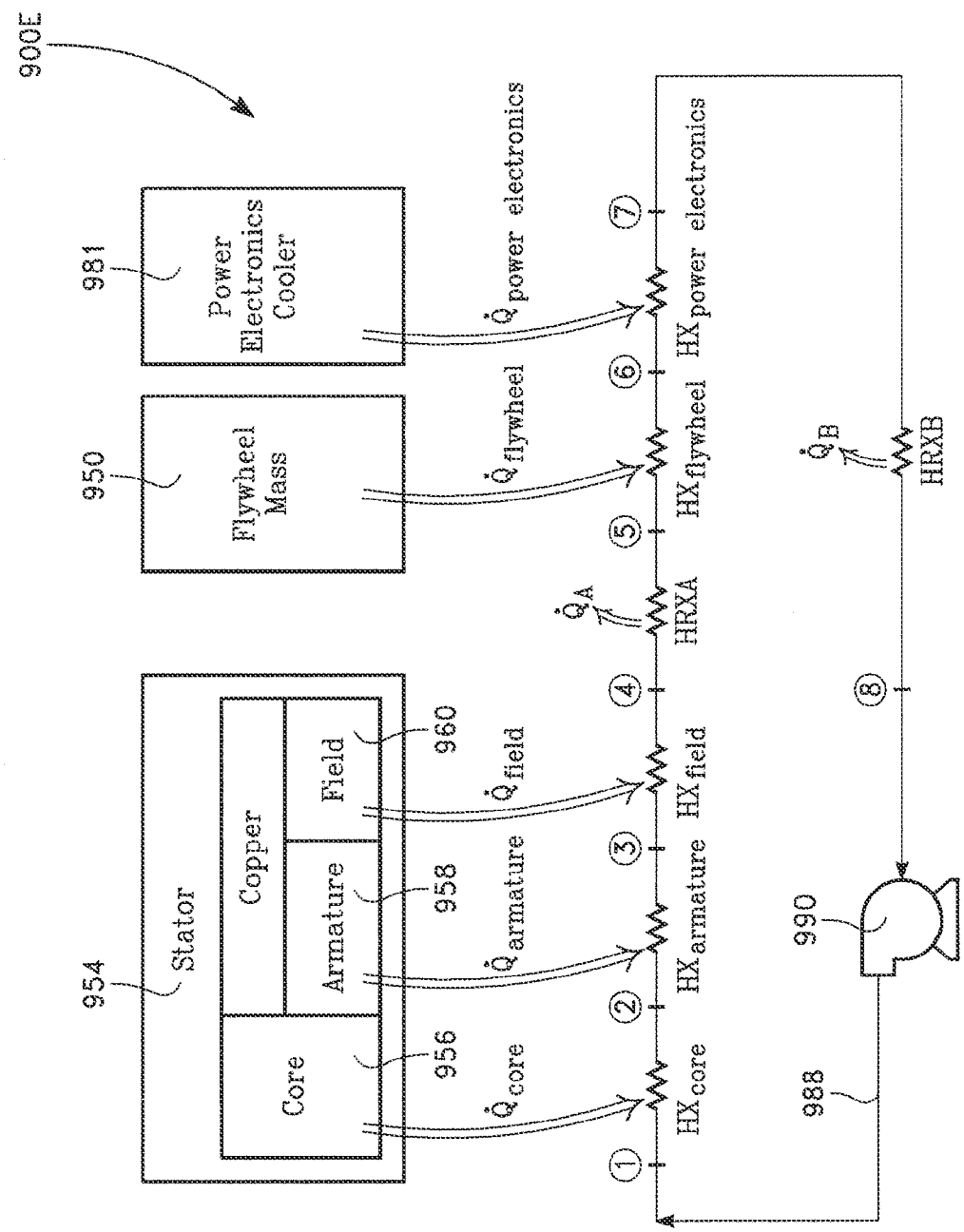
FIG. 9E shows a schematic diagram of a second electromechanical flywheel cooling system of the electromechanical flywheel machine of FIG. 1.

FIG. 9E,F show a schematic diagram 900E and a chart of temperature indications vs. state points 900F of a second electromechanical flywheel cooling system for cooling the electromechanical flywheel of FIGS. 9C,D. Coolant is transported in a fluid circuit 988 by a fluid pump 990. The circulating fluid coolant absorbs heat produced by electrical and frictional losses. In particular, the fluid absorbs heat from electrical losses of the motor-generator stator 954 and the power electronics cooler 981. In addition, the fluid absorbs heat from frictional/drag losses associated with the flywheel mass 950. Suitable fluids include water, glycol, commercial heat transfer fluids such as DOWTHERM™ and halogenated hydrocarbons, and other suitable fluid heat transfer media known to skilled artisans.

Heat removed from the stator includes losses from the stator core (iron loss) 956, the stator armature 958 (copper loss), and the stator field 960 (copper loss). Core heat losses $Qdot_{core}$ are transferred to the coolant in a heat exchange $HX_{core}$ raising the temperature of the coolant from T1 to T2. Here, heat transfer paths include path a) core 956 to small diameter section of the stator support 925 to the coolant and path b) core 956 to heat pipes 970 to large diameter section of the stator support 922 to the coolant. Armature heat losses $Qdot_{armature}$ are transferred to the coolant in a heat exchange $HX_{armature}$ raising the temperature of the coolant from T2 to T3. Armature heat transfer paths include paths a) and b) above. Field heat losses $Qdot_{field}$ are transferred to the coolant in a heat exchange HXfield raising the temperature of the coolant from T3 to T4. Field heat transfer paths include paths a) and b) above.

Coolant leaving the stator support 934 is conveyed by the fluid plenum 919 to the outer heat transfer path 920 where heat is rejected by the coolant. Coolant heat loss $Qdot_A$ is transferred, for example to the surrounding environment, in a heat exchange HRXA lowering the temperature of the coolant from T4 to T5. Heat transfer paths include path c) coolant to outer heat transfer path outer wall 912 to the surrounding environment 944.

Coolant leaving the outer heat transfer path 938 enters the inner heat transfer path 918 where heat is absorbed by the coolant. Flywheel mass drag losses $Qdot_{flywheel}$ are transferred to the coolant in a heat exchange $HX_{flywheel}$ raising the temperature of the coolant from T5 to T6. Heat transfer paths include path d) heated flywheel space atmosphere 929 to inner heat transfer path inner wall 980 to coolant.

Coolant leaving the inner heat transfer path 940 enters a power electronics cooler 981 such as a cold plate where heat $Qdot_{power\ electronics}$ is transferred from power electronics in a heat exchange $HX_{power}$ electronics raising the temperature of the coolant from T6 to T7. Heat transfer paths include path e) power electronics to coolant, directly or indirectly. Exemplary cooled power electronics components include power semiconductors. In various embodiments, heat transferred from these devices is via one or both of direct coolant contact with a power electronics component and indirect cooling such as cooling utilizing a cold plate with internal coolant channels. See for example the cold plates of MaxQ Technology, LLC of Tempe, Ariz. including the MQT series cold plates such as the MQT 1617 cold plate.

After leaving the power electronics cooler, coolant enters a heat exchanger HRXB where heat is rejected by the coolant. Typical heat rejection devices include finned tube heat exchangers such as cross-flow type compact heat exchangers that are fan cooled. Coolant heat loss $Qdot_B$ is transferred in a heat exchange HRXB lowering the temperature of the coolant from T7 to T8. Heat transfer paths include path f) coolant to heat exchanger to surrounding environment.

Coolant circulation is provided by coolant pump 990 located between the heat exchange HRXB and the heat exchange $HX_{core}$. Work done on the coolant by the pump tends to heat the coolant from T8 to T1. To the extent the coolant is a gas such as a halogenated hydrocarbon, coolant heating can in cases present a significant load on downstream heat rejection devices. In some embodiments, the location of the pump 990 and the heat exchange HRXB in the fluid circuit is reversed to provide for cooling downstream of the pump, such as might be the case when a compressible coolant fluid is used.

Between state-points 1 and 4, the fluid is heated by the motor-generator stator losses $Qdot_{core}$ (state point 1 to 2), $Qdot_{armature}$ (state point 2 to 3), and $Qdot_{field}$ (state point 3 to 4). Between state-points 4 and 5, the coolant is cooled by heat rejection $Qdot_A$. Between state-points 5 and 6, the coolant is heated by flywheel drag $Qdot_{flywheel}$. Between state-points 6 and 7, the coolant is heated by power electronics heat losses $Qdot_{power\ electronics}$. Between state-points 7 and 8, the coolant is cooled by heat rejection $Qdot_B$. And, between state-points 8 and 1, the coolant is heated by work of the pump 990.

Figure 9F:
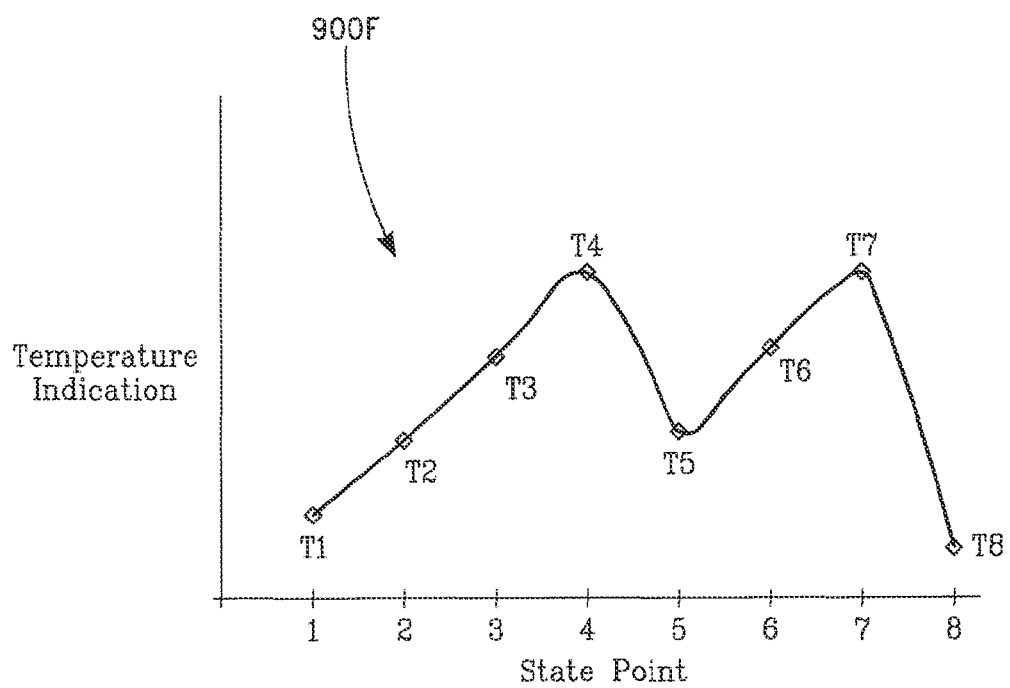
FIG. 9F shows a chart of temperature indications versus state points for the second electromechanical flywheel cooling system.

It should be noted that the above described coolant fluid heat exchanges and resulting fluid temperature changes indicate only one of multiple possible thermal designs and only one of multiple possible sets of operating conditions. For example, another thermal design (e.g., smaller or larger HRXA) and/or different operating conditions (e.g., standby operation versus fully loaded generator), the temperature change between state-points 2 and 3 might be smaller or larger. Therefore, FIG. 9F provides but one of multiple possible sets of state-points, intending to illustrate concepts consistent with the present invention through the use of specific examples, the examples not being intended to limit the generality of the disclosure.

Notably, cooling loads may be distributed by load type, such as power electronics cooling. Cooling loads may be further distributed, such as where a particular type of cooling load is distributed.

Figure 10A:
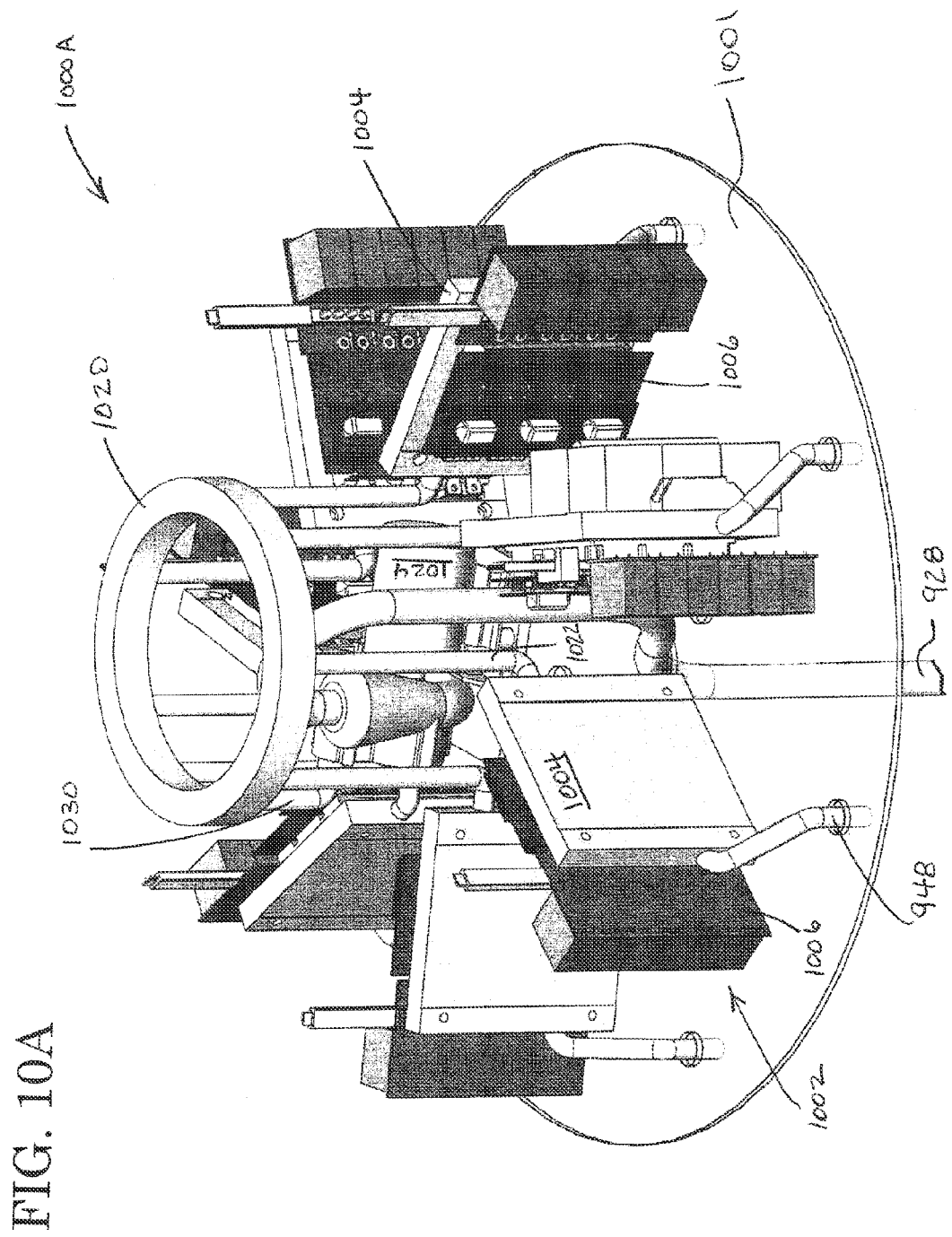
FIGS. 10A, 10B show perspective and plan views of distributed power electronics and distributed power electronics cooling.
Figure 10B:
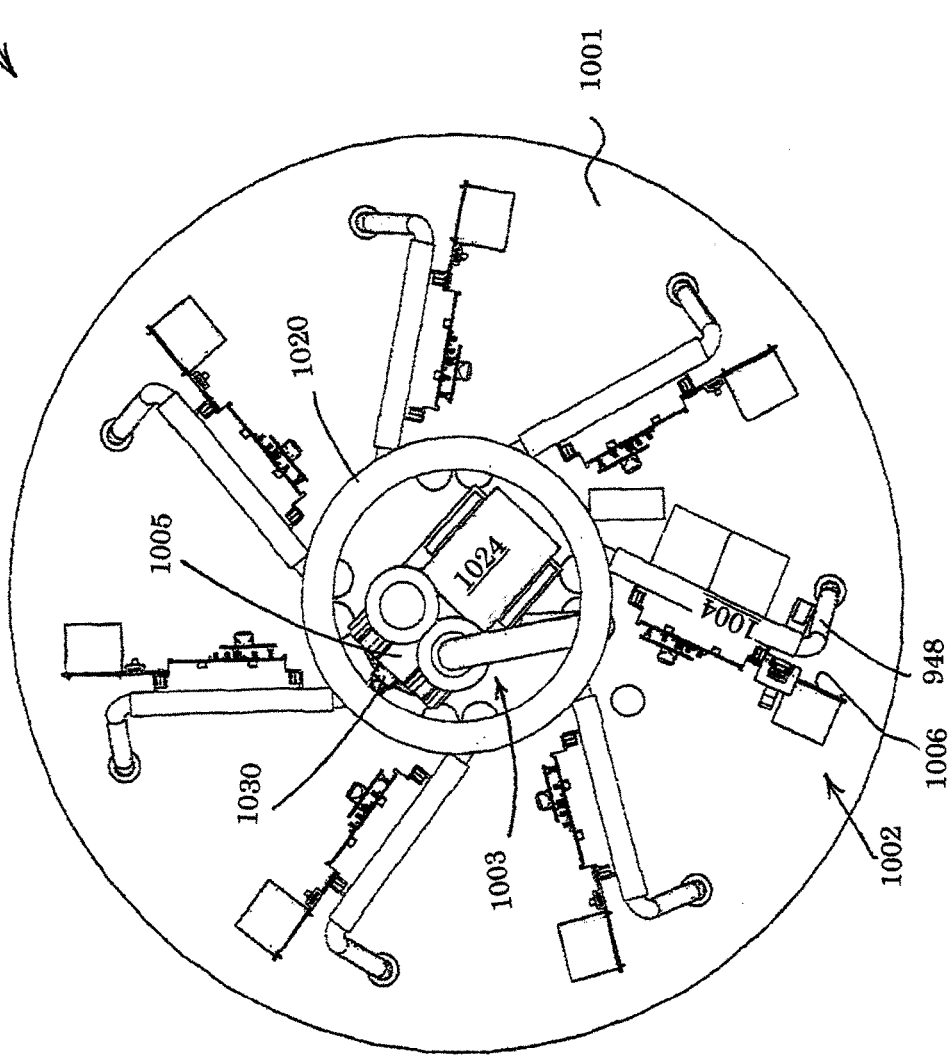

In some embodiment, power electronics 216 are distributed and provide, inter alfa, means for distributing not only electric power loads, but also corresponding cooling loads. FIGS. 10A and 10B show distributed power electronics and a distributed power electronics cooling 1000A, 1000B.

As shown in FIGS. 10A, 10B, a surface such as a flywheel machine surface 1001 provides a surface for supporting and/or mounting distributed power electronics modules 1002 (seven shown). This surface may be about coextensive with, coextensive with, or the same surface as the outer lid 913 (See also FIGS. 9C, 9D).

Distributing the power electronics 216 (See also FIG. 2) among power electronics modules 1002 enables distributing the corresponding cooling loads as mentioned above. Shown here are seven power electronics modules 1002, each module including an electronics package 1006 with power semiconductors such as integrated gate bipolar transistor ("IGBT") semiconductors and each including a cold plate 1004 for absorbing heat generated by the electronics package. A plurality of the power electronics modules exchange electric power with the stator 120.

As skilled artisans will appreciate, the power electronics cooling load is divided among the cooling plates.

Main components used in cooling each power electronics module include the cold plate 1004, the fluid exit conduit (here a cold plate inlet conduit) 948, and a cold plate exit conduit 1022. Components that are common to all of the modules include a coolant fluid circulation pump 1003, a pump suction side manifold, and the coolant entry conduit 928. In various embodiments, the cold plate is interposed in a fluid circuit with a pump for moving coolant from a peripheral region of the electromechanical flywheel to a central region of the electromechanical flywheel, such as from an inner cooling path near the electromechanical flywheel periphery to a small annular flow passage near a central portion of the electromechanical flywheel.

The coolant pump 1003 includes a prime mover such as an electric motor 1024 for operating a pump head 1005. The suction side of the pump is fluidly coupled to a pump suction manifold 1020 via a pump suction conduit 1030. The pump discharge is fluidly coupled to the inner cooling path 918 via the coolant entry conduit 928.

In operation, a distributed power electronics module 1002 is cooled by coolant fluid supplied from the inner cooling path 918 via a coolant exit conduit 948 that is fluidly coupled with a power electronics module cold plate 1004. Coolant passages within the cold plate (not shown) route the coolant to a fluidly coupled cold plate exit conduit 1022. This conduit is fluidly coupled to the pump suction manifold 1020 such that pump 1003 operation draws coolant from the inner cooling path 918, through the cold plate, the pump suction manifold, and the pump. Coolant discharged from the pump is returned to the small annular flow passage 925 via the coolant entry conduit 928.

Turning now to operation of the flywheel system, in various embodiments, a flywheel mass of the electromechanical flywheel is accelerated by the motor-generator during flywheel charging. During charging, energy is transferred to the motor-generator. During discharge, the motor-generator converts the kinetic energy of the flywheel into electrical energy as the flywheel mass is decelerated. Power electronics provide for conversion of network electric power in order to motor the motor-generator and the mechanically coupled flywheel mass. Power electronics also provide for conversion of motor-generator generated electric power into a waveform suited for use by the electrical network to which the electric power is transferred.

In operation, embodiments of the electromechanical flywheel system cooling system such as those shown in FIGS. 8 and 9A-F utilize a stator support 811, 927 to conduct a fluid coolant through a machine core assembly 112. A pump 906, 990 circulates a coolant fluid through the stator support to absorb electromechanical flywheel system electrical and frictional losses that manifest as heat. Various embodiments include one or more of an outer cooling path 920 for coolant heat rejection, an inner cooling path 918 for heat absorption, and heat exchange area enhancements such as fins 926 extending from an inner wall 937 of the stator support 927. In an embodiment, a heat exchanger outside the outer enclosure 933 provides for coolant cooling such as cooling via forced convection.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. An electromechanical flywheel comprising: a motor-generator including a rotor encircling a stator;
   one or more stator field coils encircling an axis of rotation of the rotor;
   a housing enclosing the motor-generator stator and rotor; and,
   the stator suspended by a fluid cooled stator support that hangs from the housing;
   wherein the flywheel further comprises a plurality of stator armature coils that do not encircle the axis of rotation of the rotor.

2. The electromechanical flywheel of claim 1 further comprising:
   a moving plate interengaging a mechanical bearing;
   movement of the plate for selectively coupling the bearing and the rotor; and,
   the moving plate supported by the stator support.

3. The electromechanical flywheel of claim 1 wherein the motor-generator is a homopolar machine.

4. The electromechanical flywheel of claim 1 further comprising:
   an entry conduit operative to supply fluid coolant to the stator support; and,
   the entry conduit and a surrounding wall of the stator support defining an annular flow space for removing fluid coolant from the stator support.

5. An electromechanical flywheel comprising:
a motor-generator including a rotor encircling a stator;
a housing enclosing the motor-generator stator and rotor;
the stator suspended by a hollow stator support;
the stator support operative to transfer heat from the stator and to heat a fluid coolant in the stator hollow;
a plurality of heat rods, each heat rod having a heat absorbing section and a heat rejecting section;
the heat absorbing section of each heat rod inserted in a respective stator slot; and,
the heat rejecting section of each heat rod thermally coupled to the fluid cooled stator support.

6. The electromechanical flywheel of claim 5 further comprising:
an entry conduit operative to supply fluid coolant to the stator support; and,
the entry conduit and a surrounding wall of the stator support defining an annular flow space for removing fluid coolant from the stator support.

7. The electromechanical flywheel of claim 6 further comprising:
a fluid coolant pump moving fluid coolant in a coolant circuit; and,
the coolant circuit including the entry conduit and the annular flow space.

8. The electromechanical flywheel of claim 7 further comprising:
an outer jacket encircling the motor-generator stator and rotor; and,
the outer jacket for cooling a fluid in an outer jacket flow passage.

9. The electromechanical flywheel of claim 8 wherein the coolant circuit includes the outer jacket flow passage.

10. The electromechanical flywheel of claim 9 wherein the inner and outer jacket flow passages are separated by a common intermediate wall.

11. The electromechanical flywheel of claim 10 wherein the outer jacket has an outer air cooled wall.

12. The electromechanical flywheel of claim 5 further comprising:
an outer jacket encircling the motor-generator stator and rotor; and,
the outer jacket for cooling a fluid in an outer jacket flow passage.

13. The electromechanical flywheel of claim 12 further comprising:
an inner jacket encircling the motor-generator stator and rotor;
the inner jacket encircled by the outer jacket; and,
the inner jacket for heating a fluid in an inner jacket flow passage.

14. The electromechanical flywheel of claim 13 further comprising:
a fluid coolant pump moving fluid coolant in a coolant circuit; and,
the coolant circuit including an entry conduit passing through a fluid plenum, the entry conduit operative to supply fluid coolant to the stator support, the entry conduit and a surrounding wall of the stator support defining an annular flow space for removing fluid coolant from the stator support, the fluid plenum fluidly coupling the annular flow space and the outer jacket flow passage, and the inner jacket flow passage fluidly coupling the outer jacket flow passage and an exit conduit.

15. The electromechanical flywheel of claim 14 wherein:
the stator support has a large diameter section and a small diameter section;
the heat rejecting sections of the heat rods are thermally coupled to the large diameter section of the stator support;
the stator is fixed to the small diameter section of the stator support; and,
the diameters of the large and small diameter sections of the stator support are chosen to enable the use of straight heat rods.

16. The electromechanical flywheel of claim 15 further comprising:
an inner wall of the large diameter section of the stator support; and,
the inner wall supporting a plurality of fins for extending the heat transfer surface of the inner wall.

17. The electromechanical flywheel of claim 15 wherein the heat rods are elongated metallic rods.

18. The electromechanical flywheel of claim 17 wherein the heat rods are solid rods.

19. The electromechanical flywheel of claim 18 wherein the rod materials include at least one of the materials selected from the group consisting of copper and aluminum.

20. The electromechanical flywheel of claim 15 wherein the heat rods are heat pipes.

21. An electromechanical flywheel comprising:
a core assembly including a motor-generator stator;
a motor generator rotor surrounding the stator;
the stator defining an axis of rotation, having at least one field coil that encircles the axis of rotation, and having at least one armature coil that does not encircle the axis of rotation;
a flywheel mass encircling the rotor and coupled to the rotor for rotation with the rotor;
a housing enclosing the flywheel mass; and,
the stator suspended by a fluid cooled stator support that hangs from the housing.

22. An electromechanical flywheel comprising:
a core assembly including a motor-generator stator;
a motor generator rotor surrounding the stator;
the stator defining an axis of rotation, having at least one field coil that encircles the axis of rotation, and having at least one armature coil that does not encircle the axis of rotation;
a flywheel mass encircling the rotor and coupled to the rotor for rotation with the rotor;
a housing enclosing the flywheel mass; plural power electronics modules for exchanging power with the stator;
each power electronics module coupled to a fluid cooled heat exchanger; and,
each fluid cooled heat exchanger interposed in a fluid circuit including a pump for moving coolant from a peripheral region of the electromechanical flywheel to a central region of the electromechanical flywheel.

* * * * *